United States Patent
Awoniyi-Oteri et al.

(10) Patent No.: US 11,711,806 B2
(45) Date of Patent: Jul. 25, 2023

(54) DOWNLINK CONTROL INFORMATION BASED HYBRID AUTOMATIC REPEAT REQUEST PROCESS IDENTIFIER SHARING FOR MULTIPLE SEMI PERSISTENTLY SCHEDULED CONFIGURATIONS

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Ozcan Ozturk, San Diego, CA (US); Jing Sun, San Diego, CA (US); Junyi Li, Fairless Hills, PA (US); Sony Akkarakaran, Poway, CA (US); Xiaoxia Zhang, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/332,881

(22) Filed: May 27, 2021

(65) Prior Publication Data

US 2021/0377986 A1    Dec. 2, 2021

Related U.S. Application Data

(60) Provisional application No. 63/032,492, filed on May 29, 2020.

(51) Int. Cl.
*H04W 72/12* (2023.01)
*H04L 1/18* (2023.01)
(Continued)

(52) U.S. Cl.
CPC ....... *H04W 72/1273* (2013.01); *H04L 1/1812* (2013.01); *H04W 72/23* (2023.01)

(58) Field of Classification Search
CPC ... H04W 28/04; H04W 72/04; H04W 72/042; H04W 88/08; H04W 72/1273; H04W 72/1289; H04L 5/0007; H04L 1/1812
(Continued)

(56) References Cited

U.S. PATENT DOCUMENTS

| | | | |
|---|---|---|---|
| 2012/0113946 A1* | 5/2012 | Seo | H04L 5/0094 370/329 |
| 2014/0092824 A1* | 4/2014 | He | H04W 28/0252 370/329 |
| 2019/0149279 A1* | 5/2019 | Lee | H04W 28/0278 370/329 |

OTHER PUBLICATIONS

3GPP TSG-RAN WG2 #105 bis, Xi'an, China, Apr. 8-Apr. 12, 2019, R2-1903584, Source: NTT DOCOMO, Inc., Title: SPS enhancements for TSC traffic, Agenda item: 11.7.2.2.—Scheduling Enhancements. (Year: 2019).*

(Continued)

*Primary Examiner* — Peter G Solinsky
*Assistant Examiner* — Sanjay K Dewan
(74) *Attorney, Agent, or Firm* — Patterson + Sheridan, L.L.P.

(57) ABSTRACT

Techniques and apparatus for using downlink control information (DCI) to avoid hybrid automatic repeat request (HARQ) process identifier (ID) conflicts in scenarios where multiple semi persistently scheduled (SPS) configurations share the same pool of HARQ process IDs are provided. One example technique involves a user equipment (UE) receiving an indication of a plurality of SPS configurations, each SPS configuration allocating the UE with a set of SPS occasions for physical downlink shared channel (PDSCH) transmissions. Information for resolving a conflict between
(Continued)

a first HARQ process ID associated with a first SPS occasion of a first of the plurality of SPS configurations and a second HARQ process ID associated with a second SPS occasion of a second of the plurality of SPS configurations is received. The first SPS occasion occurs prior to the second SPS occasion. The conflict is resolved based on the information.

30 Claims, 17 Drawing Sheets

(51) Int. Cl.
    *H04W 72/1273*     (2023.01)
    *H04L 1/1812*     (2023.01)
    *H04W 72/23*     (2023.01)

(58) Field of Classification Search
    USPC .......................................... 370/329
    See application file for complete search history.

(56) References Cited

OTHER PUBLICATIONS

3GPP TSG-RAN WG2 Meeting 105, Athens, Greece, Feb. 25-Mar. 1, 2019, R2-1900152, Source: CATT, Title: Multiple active SPS and Configured Grant Configurations, Agenda item: 11.7.2.2. (Year: 2019).*

3GPP TSG-RAN WG2 Meeting # 105 bis, Xi'an, China, Apr. 8-12, 2019, R2-1903149, Revision of R2-1900152, Source: CATT, Title: MAC-specific aspects of SPS & CG configurations, Agenda item: 11.7.2.2. (Year: 2019).*

CATT: "MAC-Specific Aspects of SPS&CG Configurations", 3GPP Draft, 3GPP TSG-RAN WG2 Meeting #105bis, R2-1903149 MAC-Specific Aspects of SPS&CG Configurations, 3rd Generation Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700503, 3 pages.

CATT: "Multiple Active SPS and Configured Grant Configurations", 3GPP Draft, 3GPP TSG-RAN WG2 Meeting 105, R2-1900152, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 15, 2019 (Feb. 15, 2019), XP051601552, 5 pages, Retrieved from the Internet: URL: http://www.3gpp.org/ftp/tsg%5Fran/WG2%5FRL2/TSGR2%5F105/Docs/R2%2D1900152%2Ezip [retrieved on Feb. 15, 2019], the whole document.

International Search Report and Written Opinion—PCT/US2021/034939—ISA/EPO—dated Sep. 10, 2021.

NTT DOCOMO INC: "SPS Enhancements for TSC Traffic," 3GPP Draft, 3GPP TSG-RAN WG2 #105bis, R2-1903584, 3rd Generation Partnership Project (3GPP), Mobile Competence Centre, 650, Route Des Lucioles, F-06921, Sophia-Antipolis Cedex, France, vol. RAN WG2, No. Xi'an, China, Apr. 8, 2019-Apr. 12, 2019, Apr. 6, 2019 (Apr. 6, 2019), XP051700927, 4 pages, Retrieved from the Internet: URL: http://www.3gpp.org/ftp/Meetings%5F3GPP%5FSYNC/RAN2/Docs/R2%2D1903584%2Ezip [retrieved on Apr. 6, 2019] p. 2-p. 3.

* cited by examiner

DOWNLINK CONTROL INFORMATION BASED HYBRID AUTOMATIC REPEAT REQUEST PROCESS IDENTIFIER SHARING FOR MULTIPLE SEMI PERSISTENTLY SCHEDULED CONFIGURATIONS

CROSS-REFERENCE TO RELATED APPLICATION

This application claims the benefit of and priority to U.S. Provisional Application No. 63/032,492, filed May 29, 2020, which is assigned to the assignee hereof and hereby expressly incorporated by reference herein.

BACKGROUND

I. Field of the Disclosure

Aspects of the present disclosure relate to wireless communications, and more particularly, to downlink control information (DCI)-based techniques for avoiding hybrid automatic repeat request (HARQ) process identifier (ID) conflicts in scenarios where multiple semi persistently scheduled (SPS) configurations share the same pool of HARQ process IDs.

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for avoiding HARQ process ID conflicts in scenarios where multiple SPS configurations share a set of HARQ process IDs.

Certain aspects of the subject matter described in this disclosure can be implemented in a method for wireless communication performed by a network entity. The method generally includes determining a plurality of semi persistently scheduled (SPS) configurations for a user equipment (UE), each SPS configuration allocating the UE with a set of SPS occasions for physical downlink shared channel (PDSCH) transmissions. The method also includes detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The method further includes transmitting information to the UE to resolve the conflict.

Certain aspects of the subject matter described in this disclosure can be implemented in an apparatus for wireless communication. The apparatus may include a processing system, comprising: a memory comprising computer-executable instructions and one or more processors configured to execute the computer-executable instructions and cause the processing system to: determine a plurality of semi persistently scheduled (SPS) configurations for a user equipment (UE), each SPS configuration allocating the UE with a set of SPS occasions for physical downlink shared channel (PDSCH) transmissions; and detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The apparatus also includes a transmitter configured to transmit information to the UE to resolve the conflict.

Certain aspects of the subject matter described in this disclosure can be implemented in an apparatus for wireless communication. The apparatus may include means for determining a plurality of semi persistently scheduled (SPS) configurations for a user equipment (UE), each SPS configuration allocating the UE with a set of SPS occasions for physical downlink shared channel (PDSCH) transmissions. The apparatus also includes means for detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The apparatus further includes means for transmitting information to the UE to resolve the conflict.

Certain aspects can be implemented in a non-transitory computer-readable medium for wireless communication by a network entity. The non-transitory computer-readable medium may comprise computer-executable instructions that, when executed by one or more processors of a processing system, cause the processing system to: determine a plurality of semi persistently scheduled (SPS) configurations for a user equipment (UE), each SPS configuration allocating the UE with a set of SPS occasions for physical downlink shared channel (PDSCH) transmissions; detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and transmit information to the UE to resolve the conflict.

Certain aspects can be implemented in a computer program product for wireless communication by a network entity embodied on a computer-readable storage medium. The computer-readable storage medium may include code for: determining a plurality of semi persistently scheduled (SPS) configurations for a user equipment (UE), each SPS configuration allocating the UE with a set of SPS occasions for physical downlink shared channel (PDSCH) transmissions; detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and transmitting information to the UE to resolve the conflict.

Certain aspects of the subject matter described in this disclosure can be implemented in a method for wireless communication performed by a UE. The method generally includes receiving an indication of a plurality of semi persistently scheduled (SPS) configurations, each SPS configuration allocating the UE with a set of SPS occasions for physical downlink shared channel (PDSCH) transmissions. The method also includes receiving information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The method further includes resolving the conflict based on the information.

Certain aspects of the subject matter described in this disclosure can be implemented in an apparatus for wireless communication. The apparatus may include a receiver configured to: receive an indication of a plurality of semi persistently scheduled (SPS) configurations, each SPS configuration allocating the UE with a set of SPS occasions for physical downlink shared channel (PDSCH) transmissions; and receive information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The apparatus may also include a processing system, comprising: a memory comprising computer-executable instructions and one or more processors configured to execute the computer-executable instructions and cause the processing system to resolve the conflict based on the information.

Certain aspects of the subject matter described in this disclosure can be implemented in an apparatus for wireless communication. The apparatus may include means for receiving an indication of a plurality of semi persistently scheduled (SPS) configurations, each SPS configuration allocating the apparatus with a set of SPS occasions for physical downlink shared channel (PDSCH) transmissions. The apparatus also includes means for receiving information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion. The apparatus further includes means for resolving the conflict based on the information.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: receive an indication of a plurality of semi persistently scheduled (SPS) configurations, each SPS configuration allocating the UE with a set of SPS occasions for physical downlink shared channel (PDSCH) transmissions; receive information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and resolve the conflict based on the information.

Certain aspects can be implemented in a computer program product for wireless communication by a user equipment (UE) embodied on a computer-readable storage medium. The computer-readable storage medium may include code for: receiving an indication of a plurality of semi persistently scheduled (SPS) configurations, each SPS configuration allocating the UE with a set of SPS occasions for physical downlink shared channel (PDSCH) transmissions; receiving information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and resolving the conflict based on the information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
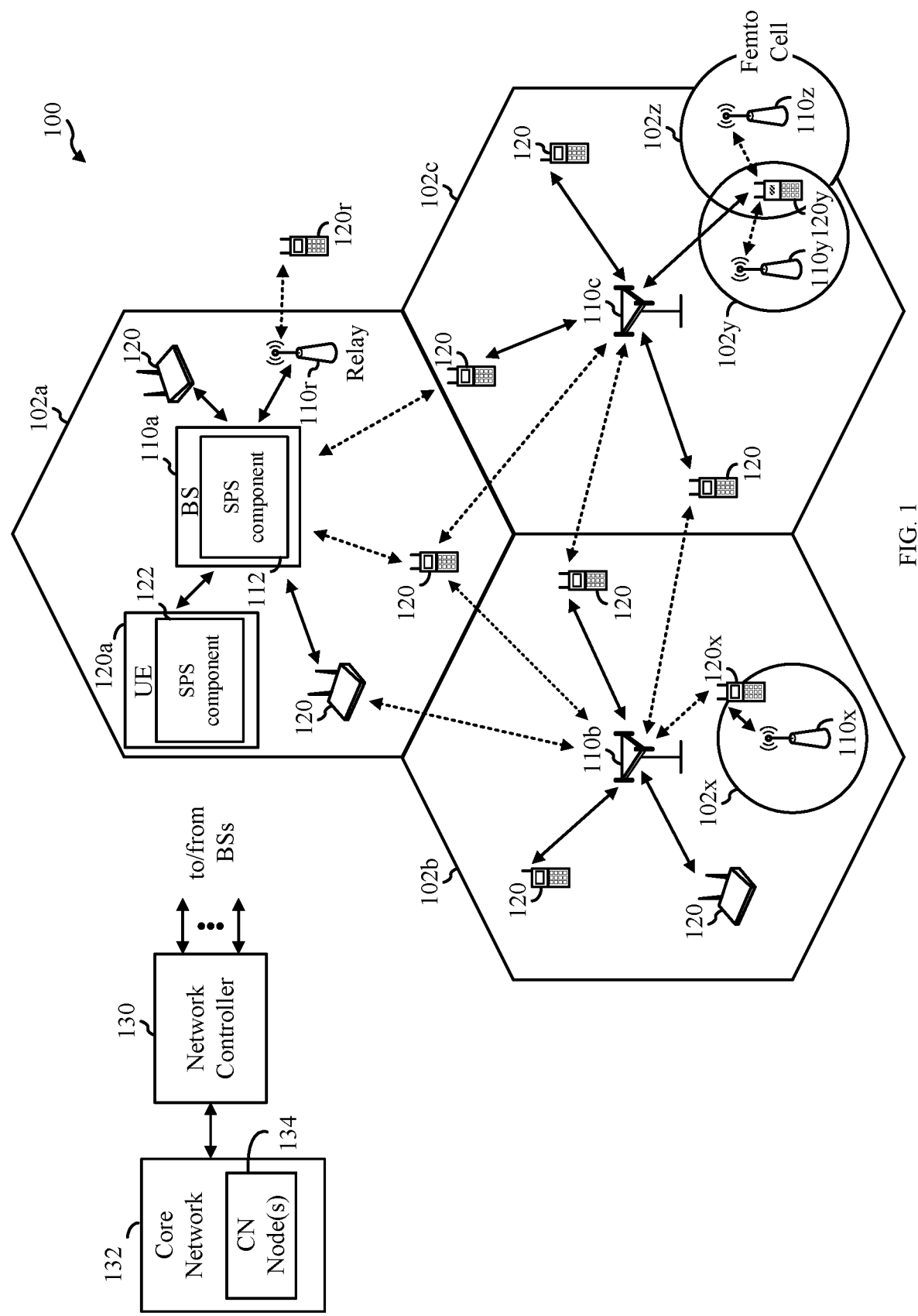
FIG. 1 is a block diagram conceptually illustrating an example telecommunications system, in accordance with certain aspects of the present disclosure.

Aspects of the present disclosure provide apparatus, methods, processing systems, and computer readable mediums for using downlink control information (DCI) to avoid hybrid automatic repeat request (HARQ) process identifier (ID) conflicts in scenarios where multiple semi-persistent scheduled (or semi-persistent scheduling) (SPS) configurations share the same pool of HARQ process IDs.

Some wireless communication systems may support SPS as a type of resource allocation (or scheduling) for downlink communications. SPS resource allocation generally refers to a scheduling technique where a UE is pre-configured (by the network/base station) with resources having a periodicity and offset for monitoring for downlink transmissions. The network can provide the UE with an SPS transmission periodicity via radio resource control (RRC) signaling. When SPS is activated (e.g., via DCI), the UE can receive SPS transmissions (e.g., physical downlink shared channel (PDSCH) transmission(s)) with the periodicity provided by RRC signaling and transmission parameters indicated by the network (as opposed to receiving a DCI prior to each data transmission).

In some cases, a wireless communication system may allow a UE to use multiple SPS configurations. An SPS configuration generally refers to a configuration of resources (e.g., via RRC signaling) having a periodicity for SPS transmissions (e.g., PDSCH transmissions). In other words, once activated, the configured periodic resources may be used for data transmission on downlink until deactivated, without dynamic resource allocation via DCI prior to each data transmission.

Each SPS configuration may be associated with one or more (periodic) SPS occasions (also referred to as data channel occasions), during which the gNB performs a SPS transmission (e.g., a PDSCH transmission) and the UE monitors for the SPS transmission. As used herein, the term "SPS occasion" generally refers to a time (or time interval) in which resource(s) are allocated for a SPS transmission (e.g., PDSCH transmission) that may or may not ultimately happen.

One issue with using multiple SPS configurations is that conflicts may arise in situations where the multiple SPS configurations share the same pool of HARQ process IDs. For example, the UE may determine a HARQ process ID for a (subsequent) SPS occasion of a first SPS configuration that conflicts with the HARQ process ID for a (previous) SPS occasion of a second SPS configuration. Current techniques for mitigating HARQ process ID conflicts between multiple SPS configurations generally involve utilizing a HARQ process ID offset into the calculation of the HARQ process ID for a given SPS occasion. This current approach may be insufficient, as HARQ process ID conflicts may still occur with the use of a HARQ process ID offset.

Accordingly, aspects disclosed herein provide one or more DCI-based techniques for avoiding HARQ process ID conflicts between multiple SPS configurations. As described in more detail below, in some aspects, the DCI-based techniques may include using individual DCI(s) to indicate a new HARQ process ID for a SPS occasion (of a SPS configuration) that has a HARQ process ID conflict with another SPS occasion (of another SPS configuration). In some aspects, the DCI-based techniques may include using DCI(s) to indicate a new HARQ process ID offset to use for a SPS occasion (of a SPS configuration) that has a HARQ process ID conflict with another SPS occasion (of another SPS configuration). In some aspects, the DCI-based techniques may include using DCI(s) to indicate that the UE is to refrain from monitoring for PDSCH transmission(s) during a SPS occasion (of a SPS configuration) that has a HARQ process ID conflict with another SPS occasion (of another SPS configuration). In some aspects, the DCI-based techniques may include using group DCI(s) to indicate multiple HARQ process IDs for multiple SPS occasions in response to detecting that at least one of the multiple SPS occasions has a HARQ process ID conflict with another SPS occasion.

Note that while many of the aspects described herein utilize DCI as a reference example of signaling that can be used to avoid HARQ process ID conflicts between multiple SPS configurations, aspects described herein are not limited to DCI signaling and may use other types of signaling. For example, aspects described herein may also use medium access control control elements (MAC-CE) to avoid HARQ process ID conflicts between multiple SPS configurations.

The following description provides examples of HARQ process ID assignment for multiple SPS configurations sharing the same HARQ process ID pool in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured to reduce (and/or avoid) HARQ process ID conflicts in scenarios where multiple SPS configurations share the same HARQ process ID pool. As shown in FIG. 1, the BS 110a includes a SPS component 112, which is configured to implement one or more of the techniques described herein for avoiding HARQ process ID conflicts. In some aspects, the SPS component 112 may be configured to perform one or more of the operations illustrated in FIG. 14. As shown in FIG. 1, the UE 120a includes a SPS component 122, which is configured to implement one or more of the techniques described herein for avoiding HARQ process ID conflicts. In some aspects, the SPS component 122 may be configured to perform one or more of the illustrated in FIG. 15.

Figure 2:
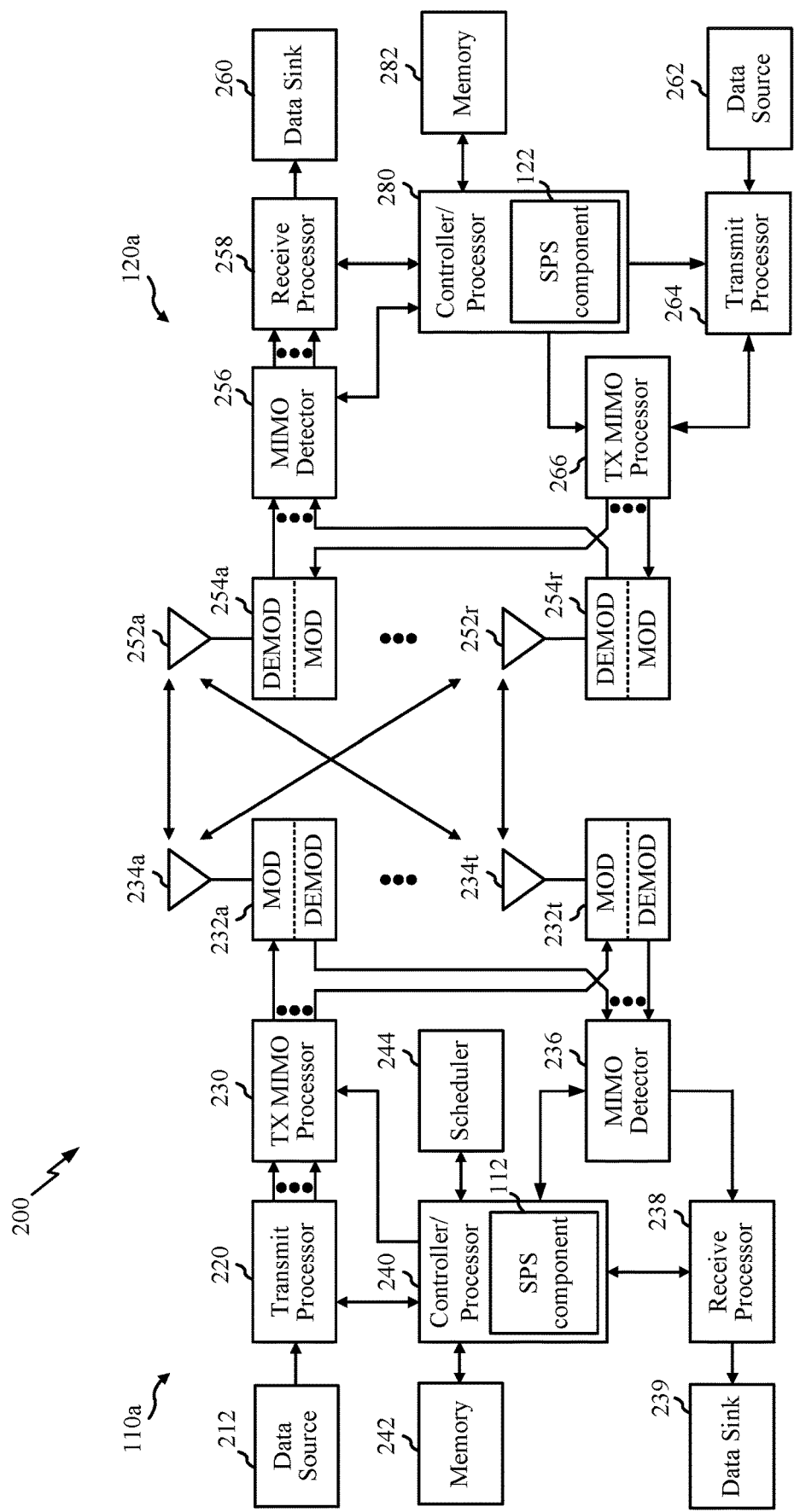
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a SPS component 112 that may be configured for avoiding HARQ process ID conflicts, according to aspects described herein. As shown in FIG. 2, the controller/processor 280 of the UE 120a has a SPS component 122 that may be configured for avoiding HARQ process ID conflicts, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
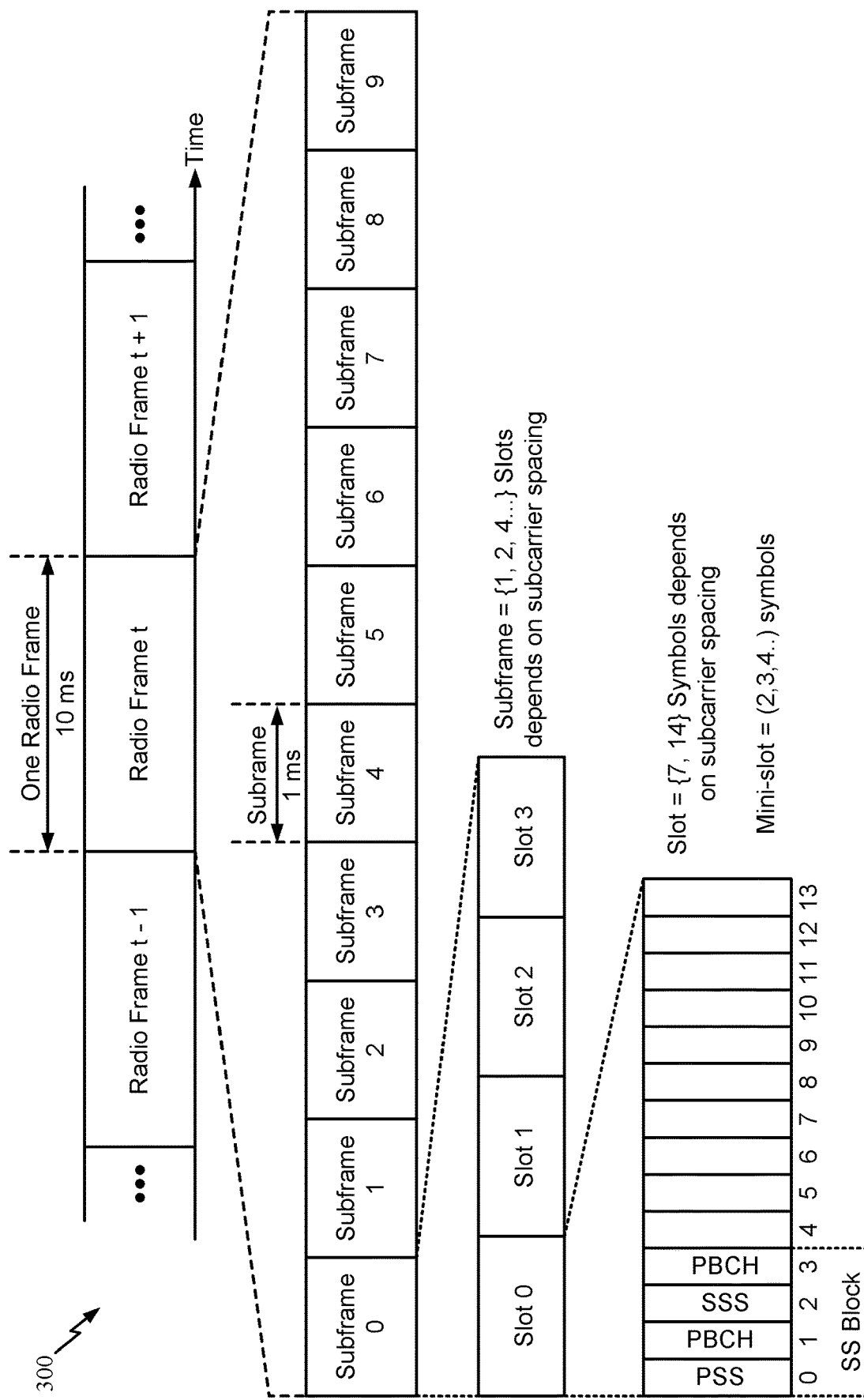
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 4:
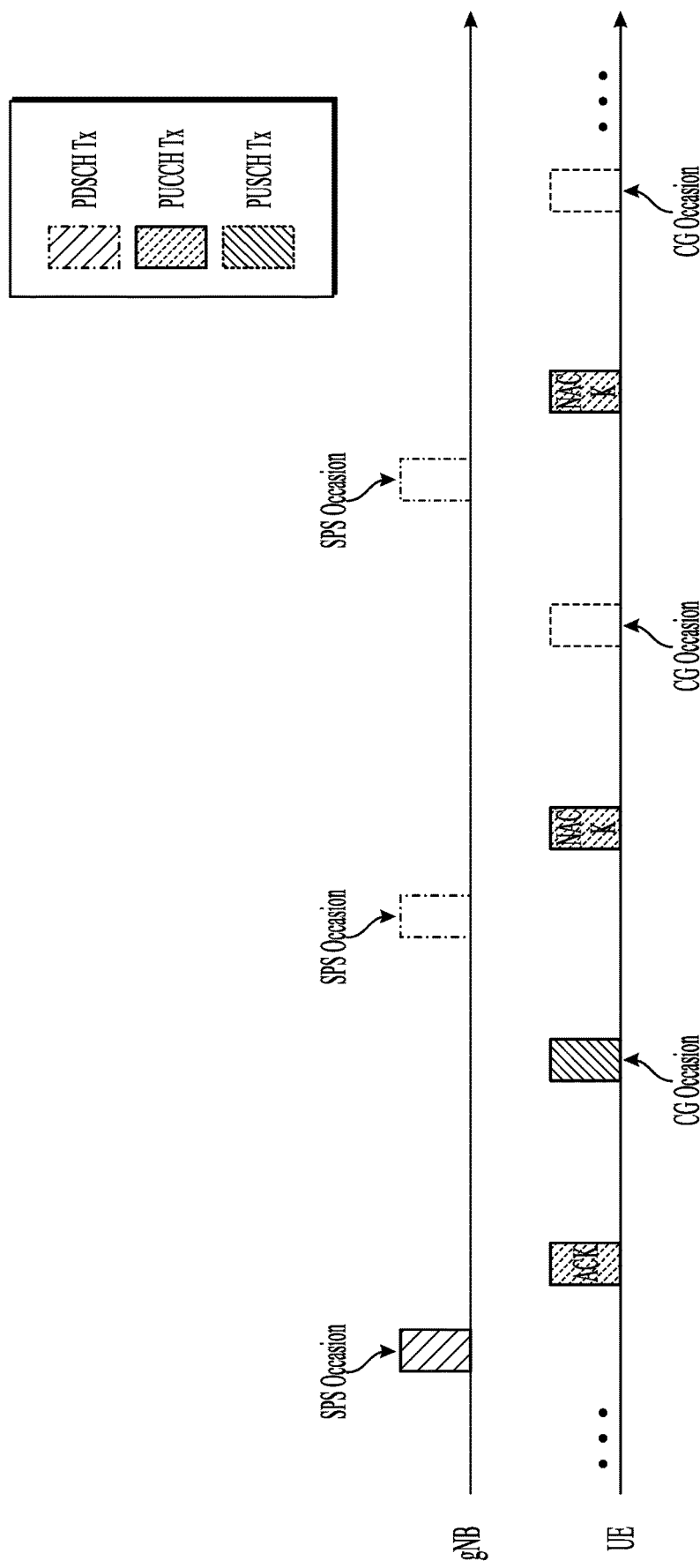
FIG. 4 illustrates an example of SPS occasions and configured grant (CG) occasions, in accordance with certain aspects of the present disclosure.

In some aspects, the wireless communication system 100 may support SPS resource allocation. SPS resource allocation, which is sometimes called configured downlink assignment, refers to a scheduling technique where a UE is pre-configured by the network/base station (e.g., eNBs, gNB, etc.) with a periodicity and an offset. As illustrated in FIG. 4, once pre-configured, if the UE were to receive an allocation of downlink resources, then the allocation of SPS occasions would repeat according to the pre-configured periodicity, resulting in periodic SPS occasions. For SPS, the base station may use RRC signaling to define the periodicity of configured downlink assignments. For example, an SPS configuration may include a periodicity (p), where the periodicity is the time between two consecutive SPS occasions. Similarly, once configured with configured grant (CG) occasions, the allocation of CG occasions (for uplink transmissions) may repeat according to the pre-configured periodicity.

As used herein, the term "occasion" generally refers to a time in which resource(s) are allocated for a transmission that may or may not ultimately happen. As noted, the term "SPS occasion" generally refers to a time (or time interval) in which resource(s) are allocated for a SPS transmission (e.g., PDSCH transmission) that may or may not ultimately happen. For example, a downlink transmission may or may not occur in an SPS occasion. Similarly, the term "CG occasion" generally refers to a time (or time interval) in which resource(s) are allocated for a CG transmission (e.g., uplink transmission) that may or may not ultimately happen. For example, an uplink transmission may or may not occur in a CG occasion. Occasions may be considered activated if the transmission may occur and, thus, those occasions should be monitored. In some cases, although an SPS configuration may be active, one or more of the SPS occasions may be empty (e.g., not have a data channel transmission).

In some cases, a UE may provide acknowledgment (e.g., hybrid automatic repeat request or HARQ) feedback, indicating whether it received a PDSCH transmission in one or more of the configured SPS occasions. In some systems (e.g., in Rel. 15) an N1-PUCCH-AN may be used to specify preconfigured PUCCH resources to be used for SPS HARQ feedbacks. For example, a PUCCH resource using PUCCH formats 0 or 1 can support up to 2 bits of feedback.

In some systems (e.g., in Rel. 16 systems), multiple SPS configurations are allowed. Each SPS configuration may include a set of SPS occasions, during which the gNB performs a SPS transmission (e.g., PDSCH transmission). One potential challenge in such cases, however, is how or if to share the HARQ process pool among multiple SPS configurations. If the HARQ process pool is shared, a HARQ Process ID offset can be used to reduce overlapping (or conflicting) HARQ processes between the SPS configurations, according to the following Equation (1) in TS 38.321:

$$\text{HARQ Process ID} = [\text{floor}(\text{CURRENT\_slot}/\text{periodicity})] \text{ modulo nrofHARQ-Processes} + \text{harq-proc ID-offset} \quad (1)$$

where CURRENT_slot=[(SFN×numberOfSlotsPerFrame)+ slot number in the frame] and numberOfSlotsPerFrame refers to the number of consecutive slots per frame (as specified in TS 38.211 [8]).

In some cases, assigning HARQ process IDs based on Equation (1) (e.g., which is a function of the SPS configuration and parameters) may not be sufficient to avoid conflicting HARQ processes between multiple SPS configurations. For example, while Equation (1) relies on a HARQ process ID offset for each SPS configuration to reduce HARQ process ID conflicts between multiple SPS configurations, in cases where the SPS configurations have different periodicities, a HARQ process ID conflict may still occur.

Figure 5:
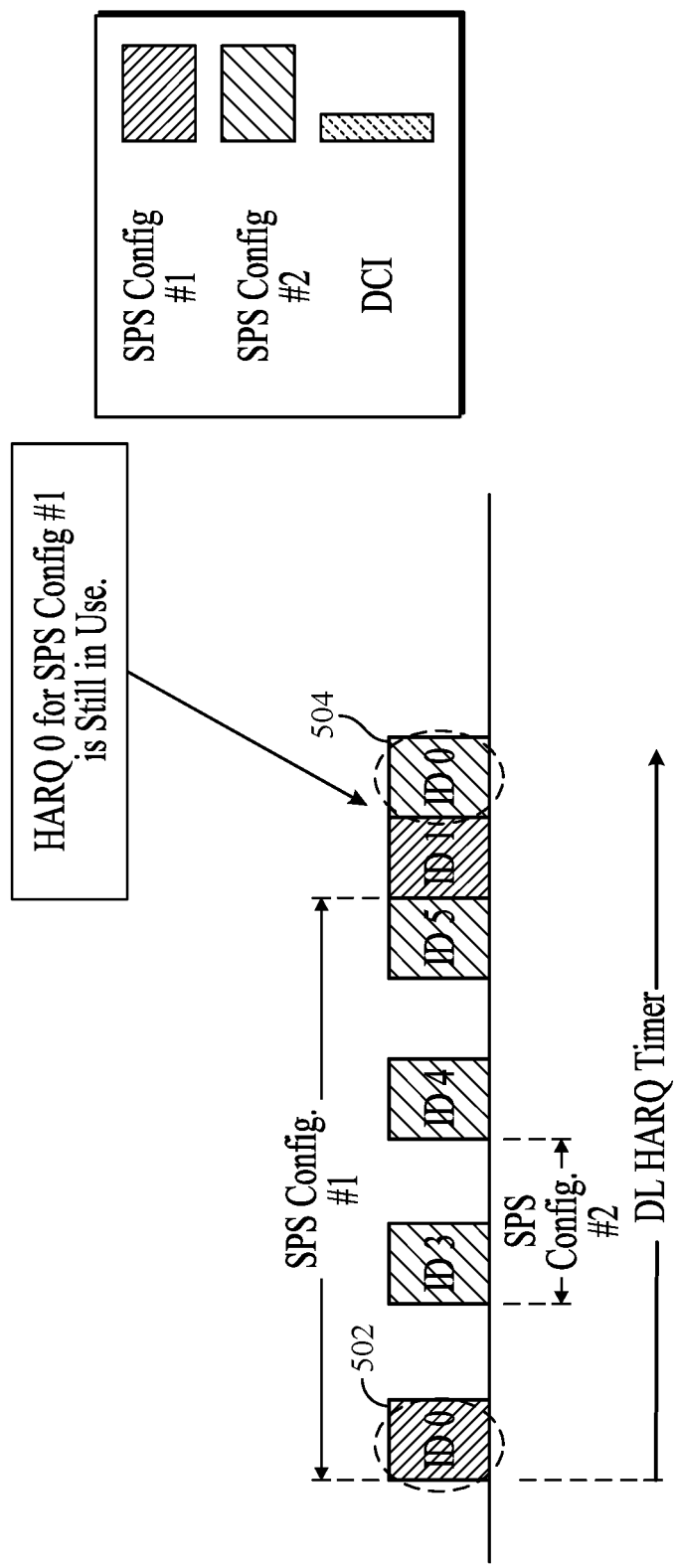
FIG. 5 illustrates an example scenario of a HARQ process ID conflict between multiple SPS configurations, in accordance with certain aspects of the present disclosure.

For example, consider the scenario depicted in FIG. 5 where the HARQ process ID 0 has a conflict between SPS configuration #1 and SPS configuration #2. In this scenario, SPS configuration #1 includes one SPS occasion, SPS configuration #2 includes one SPS occasion, SPS configuration #1 is RRC configured with a HARQ process ID offset of 0, SPS configuration #2 is RRC configured with a HARQ process ID offset of 3, and SPS configurations #1 and #2 share six HARQ processes (e.g., nrofHARQ-Process=6).

As shown, a HARQ process ID 0 may be determined for SPS occasion 502 of SPS configuration #1 and SPS occasion 504 of SPS configuration #2, based on Equation 1. However, because HARQ process ID 0 for SPS occasion 502 may still be in use by SPS configuration #1 when the UE/gNB computes HARQ process ID 0 for SPS occasion 504 of SPS configuration #2, there may be conflict between the use of this HARQ process between SPS configuration #1 and SPS configuration #2. In this particular example, the gNB may not be able to release HARQ process ID 0 from SPS configuration #1 (at the time of SPS occasion 504) because of at least one of the following: HARQ process ID 0 for SPS configuration #1 may still be in the HARQ buffer awaiting HARQ feedback, there may be a pending retransmission, the DL HARQ timer may not have expired (e.g., there is time remaining on the DL HARQ timer), there is gNB processing delay, etc.

Figure 6:
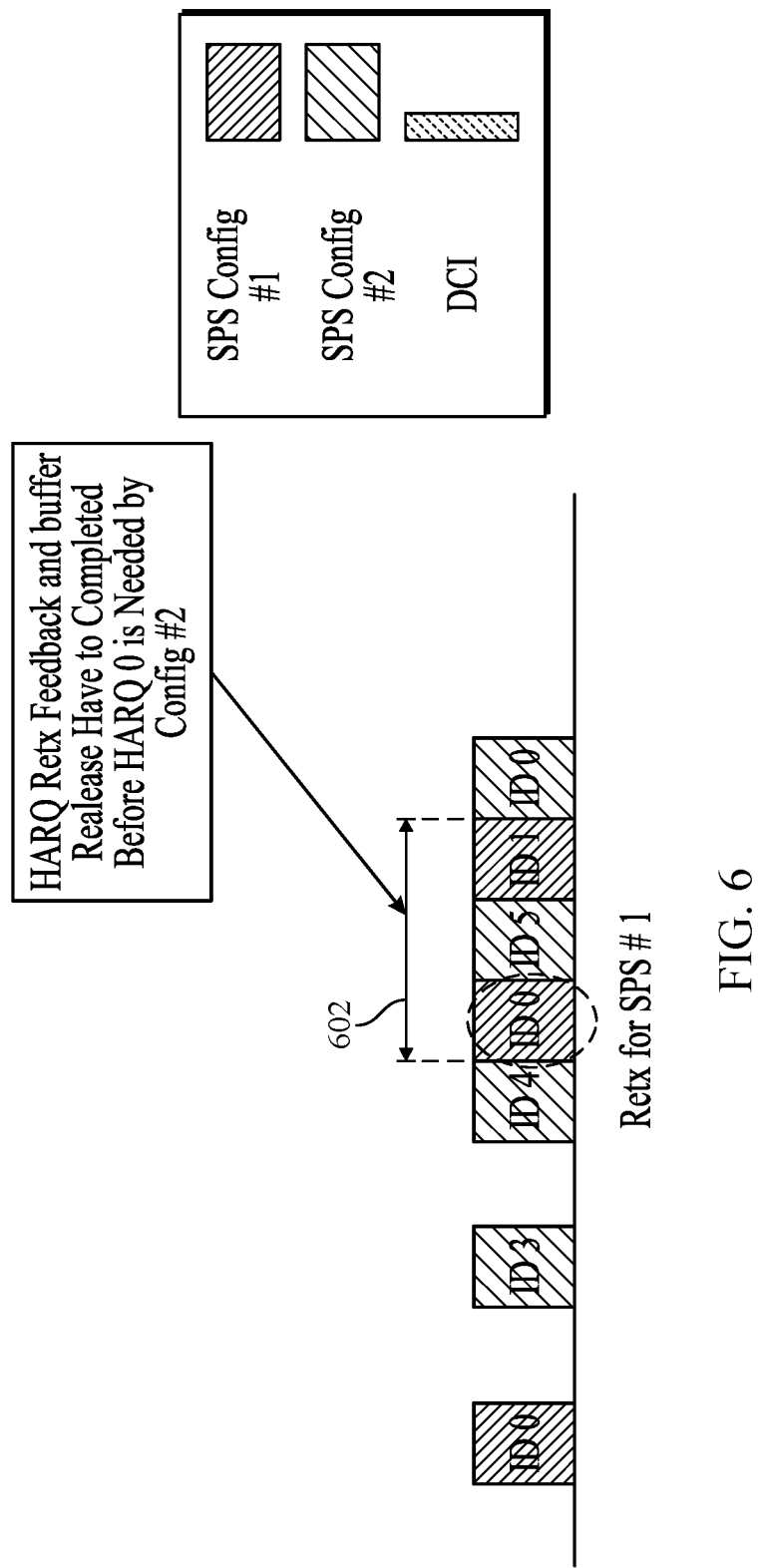
FIGS. 6-8 illustrate example scenarios for resolving a HARQ process ID conflict between multiple SPS configurations.

Conventional techniques that attempt to resolve this issue generally involve (1) retransmitting before the HARQ process ID collision, (2) using an overlapping dynamic grant, or (3) skipping the SPS occasion with the HARQ process ID collision. FIG. 6 illustrates an example scenario where the gNB retransmits the PDSCH for HARQ process ID 0 to avoid a conflict between SPS configuration #1 and SPS configuration #2 for HARQ process ID 0. In this instance, the collision may be avoided if the gNB retransmits data for HARQ process ID 0 and frees the buffer. However, in some cases, doing so may not be possible because of the HARQ feedback and gNB processing timeline. For example, the HARQ retransmission feedback and buffer release may have to be completed (within the time frame 602) before HARQ process ID 0 is needed by SPS configuration #2.

Figure 7:
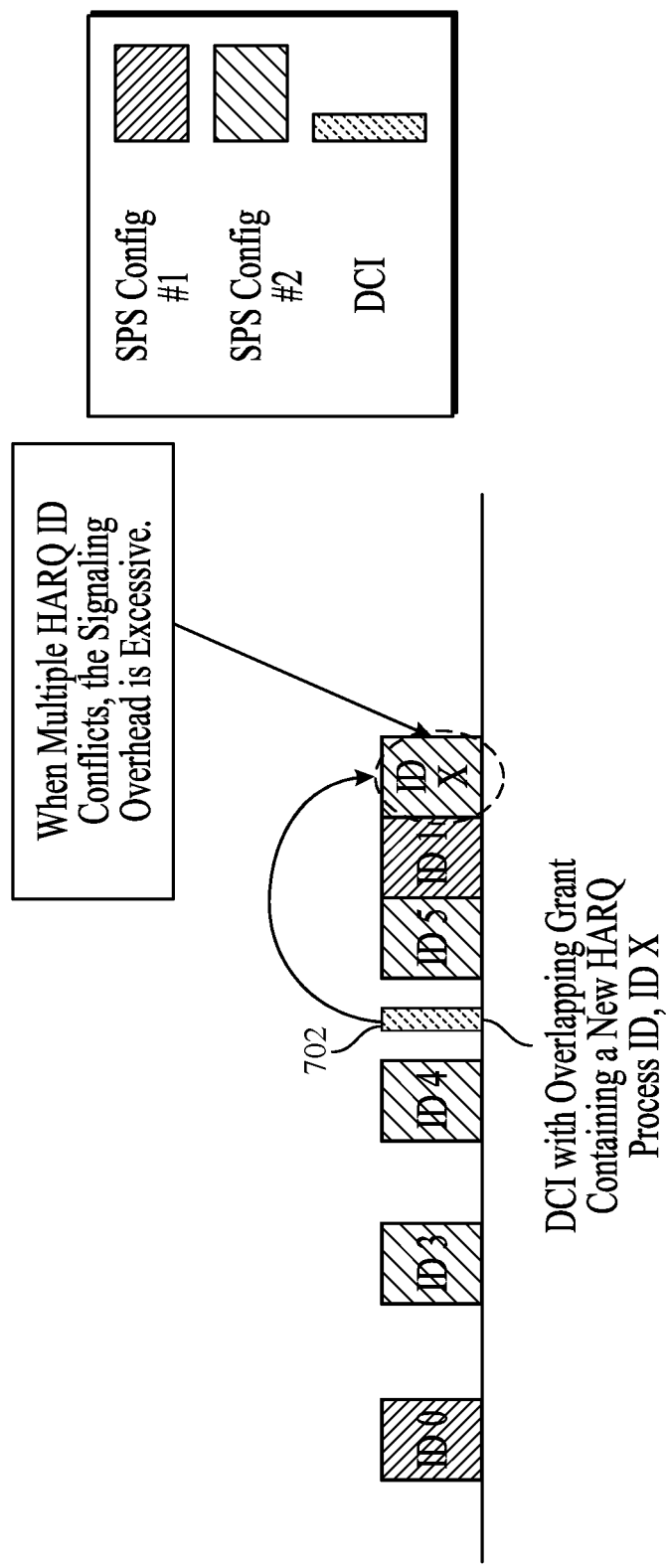

FIG. 7 illustrates an example scenario where the gNB uses a dynamic grant overlapping the SPS occasions to indicate a new HARQ process ID for the HARQ process ID in conflict. As shown, the gNB sends a DCI 702 that includes the HARQ process ID (e.g., HARQ process ID X) that the gNB wants to use to replace the HARQ ID in conflict (e.g., HARQ process ID 0). Using a dynamic grant that overlaps the SPS occasions to indicate a new HARQ process ID may lead to excessive signaling overhead, e.g., in cases with multiple HARQ ID conflicts. Additionally, the dynamic grant may include a large amount of information, e.g., control information (PDCCH) and data payload (PDSCH), that can make this approach infeasible for a large amount of conflicts.

Figure 8:
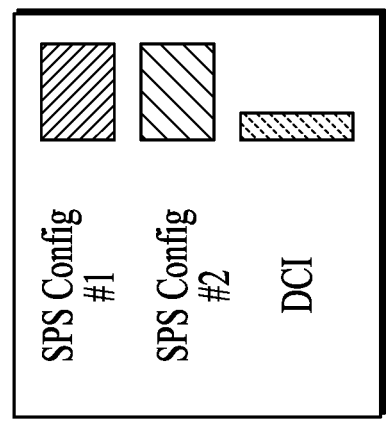
Figure 8:
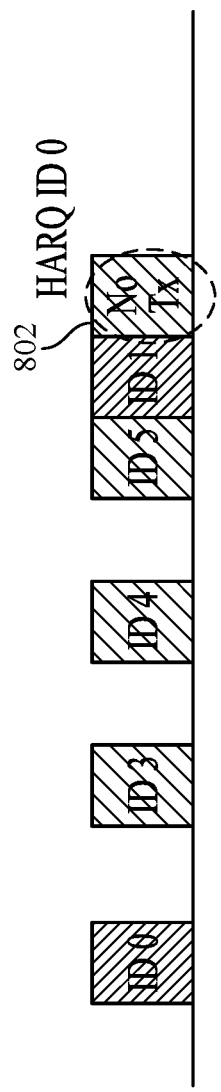

FIG. 8 illustrates an example scenario where the gNB chooses to avoid transmitting on the SPS occasion 802 with the HARQ process ID collision and to reuse the resource. In this scenario, however, the UE may still assume that the gNB is sending a transmission during SPS occasion 802 (e.g., the UE may not be aware of the gNB choosing to avoid the transmission). This, in turn, can corrupt the UE's HARQ buffer with garbage data, causing a performance impact from the UE combining data across SPS configurations.

Accordingly, it may be desirable to provide improved techniques and apparatus for HARQ process ID assignment for multiple SPS configurations sharing the same HARQ process pool to avoid conflicts between the multiple SPS configurations.

Example DCI-Based HARQ ID Sharing for Multiple SPS Configurations

Aspects of the present disclosure provide DCI-based techniques for avoiding HARQ process ID conflicts in scenarios where multiple SPS configurations share the same pool of HARQ process IDs. Compared to conventional techniques described above, the DCI-based techniques described herein may have minimal signaling overhead in terms of the content of the DCI as well as the amount of resources used for the transmissions (e.g., the DCI may be occupy (or piggyback) resources used for the SPS transmissions).

Note that while many of the aspects herein describe using DCI to carry the HARQ process ID/HARQ process ID offset, MAC signaling (e.g., MAC-CE) may be used to carry this information. Compared to DCI, MAC signaling may have more reliability (e.g., the UE generally provides an acknowledgement for MAC signaling) than DCI signaling, but increased latency (e.g., due to the acknowledgement).

Figure 9:
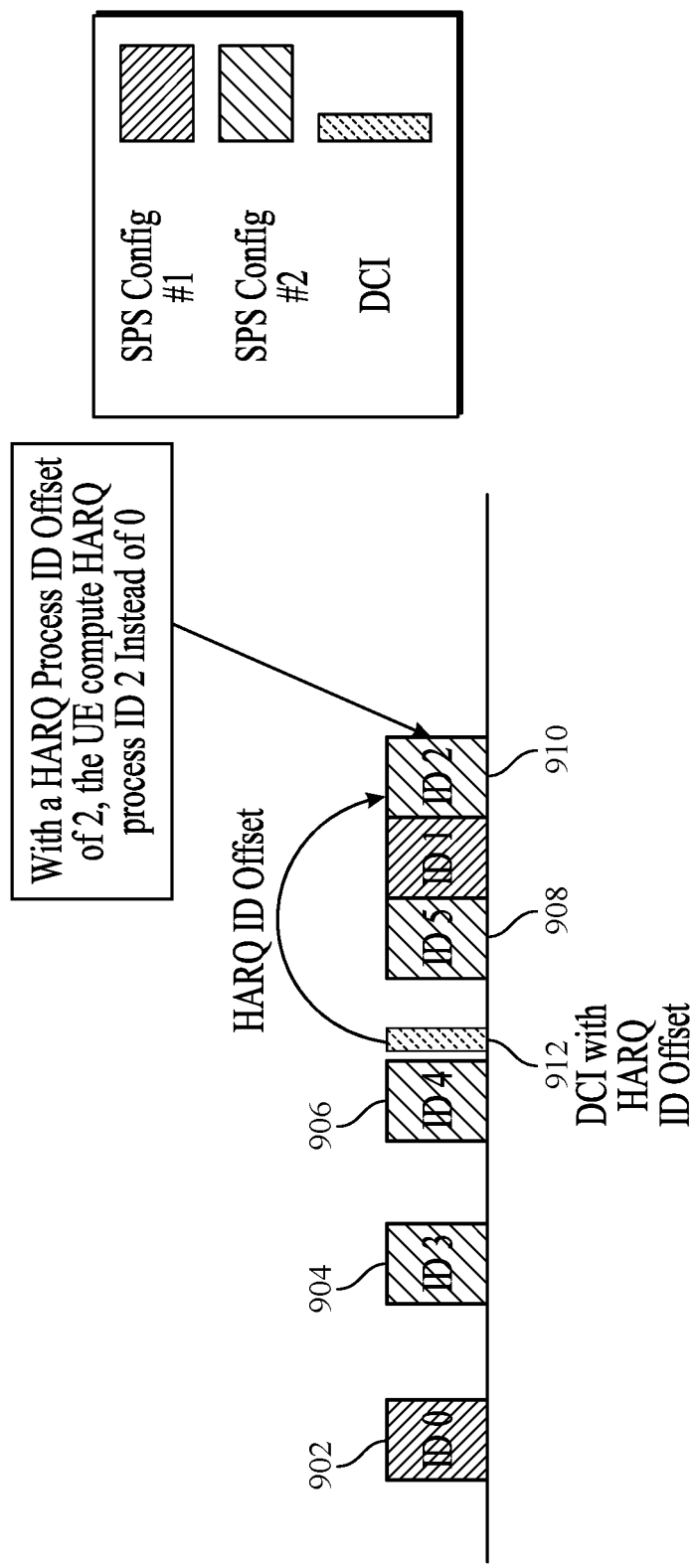
FIG. 9 illustrates an example of using DCI to avoid a HARQ process ID conflict between multiple SPS configurations, in accordance with certain aspects of the present disclosure.

In some aspects, the gNB may use DCI to indicate a new HARQ process ID offset to the UE for the SPS occasion with the HARQ process ID collision. Based on the new HARQ process ID offset, the UE can compute a new HARQ process ID (e.g., using Equation 1) for the SPS occasion, to avoid a HARQ process ID collision. FIG. 9 illustrates an example of using a DCI to indicate a new HARQ process ID offset to a UE, in accordance with certain aspects of the present disclosure. In some aspects, the gNB may determine to use a DCI to indicate a new HARQ process ID offset when certain conditions are satisfied (e.g., a number of detected conflicts is below a threshold).

In this example, the gNB may use a RRC configured HARQ ID offset (configured for SPS configuration #2) to determine HARQ process IDs 3, 4, and 5 for SPS occasions 904, 906, and 908, respectively. The gNB may determine that the HARQ process ID 0 for SPS occasion 910 conflicts with HARQ process ID 0 for previous SPS occasion 902 (of SPS configuration #1). In response to detecting the conflict, the gNB can send a DCI 912 with a new HARQ process ID offset for SPS occasion 910. As shown, the DCI 912 can indicate a new HARQ process ID offset of 2 (instead of 3). The UE in turn can compute HARQ process ID 2 instead of 0, based on the new HARQ process ID offset of 2 (e.g., using Equation 1).

In one aspect, the DCI 912 transmitted to the UE may be an optimized DCI. For example, the DCI 912 may only include at least one of the new HARQ process ID offset, the SPS configuration to which the new HARQ process ID offset applies, or the SPS occasion with the HARQ process ID collision.

In one aspect, the DCI 912 may be transmitted outside of a previous SPS occasion. In one aspect, the DCI 912 transmitted to the UE may be piggybacked on another SPS occasion (e.g., SPS occasion 902, 904, 906, 908, etc.) or PDCCH(s) that occurs prior to SPS occasion 910. For example, the DCI information can be multiplexed with the data payload of the PDSCH transmitted during this prior SPS occasion.

Figure 10:
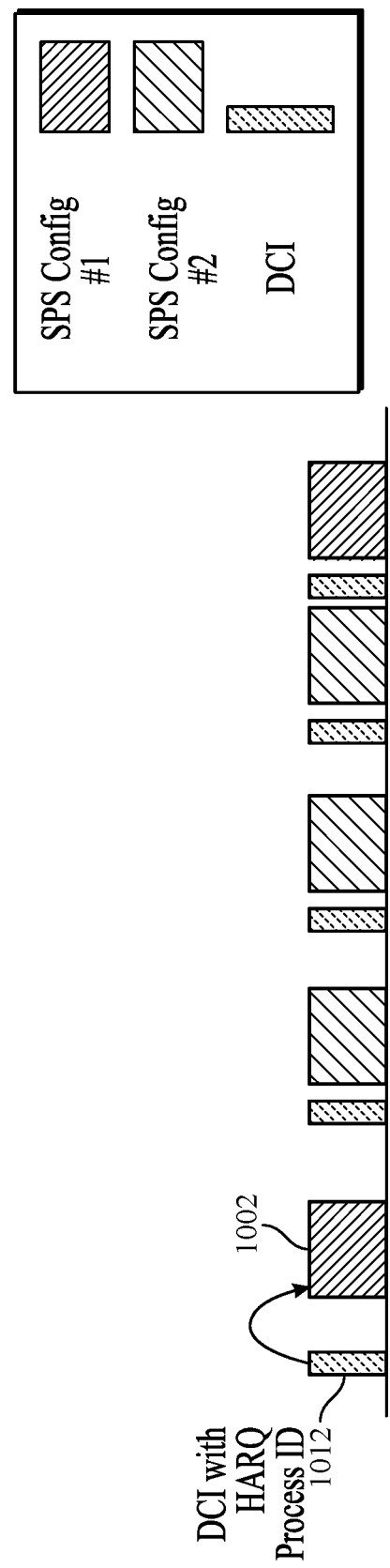
FIGS. 10-12 illustrate different examples of using DCI to avoid a HARQ process ID conflict between multiple SPS configurations, in accordance with certain aspects of the present disclosure.

In some aspects, the gNB may use DCI to indicate a new HARQ process ID to the UE for the SPS occasion with the HARQ process ID collision. FIG. 10 illustrates an example of using a DCI to indicate a new HARQ process ID to a UE, in accordance with certain aspects of the present disclosure. As shown, the gNB may send a DCI 1012 with the new HARQ process ID prior to an occurrence of the SPS occasion 1002 with the HARQ process ID collision.

In aspects described herein, the gNB can assign a new HARQ process ID during conflicts by selecting a HARQ process ID that is currently available. For example, the gNB and UE may have knowledge of the set of HARQ process IDs that are currently available and not being used. In some aspects, the gNB can assign a new HARQ process ID from a pool of reserved HARQ IDs (e.g., HARQ process IDs reserved for resolving conflicts between SPS configurations).

As noted, once a new HARQ process ID to replace the one in conflict has been selected, the gNB can use DCI 1012 to indicate the new HARQ process ID to the UE prior to sending the PDSCH transmission during the respective SPS occasion. For example, in one aspect, the DCI 1012 can be sent standalone (e.g., on PDCCH) prior to the respective SPS occasion. In another aspect, the DCI 1012 can be sent during a prior SPS occasion (e.g., by piggybacking on the resources used for PDSCH during the prior SPS occasion).

Note that, in some aspects, the gNB can send a DCI to indicate the HARQ process ID for each SPS occasion (e.g., regardless of whether a conflict is detected), as shown in FIG. 10. To reduce signaling overhead, the DCI can be optimized to only carry at least one of the HARQ process ID, SPS occasion(s), or the SPS configuration.

Figure 11:
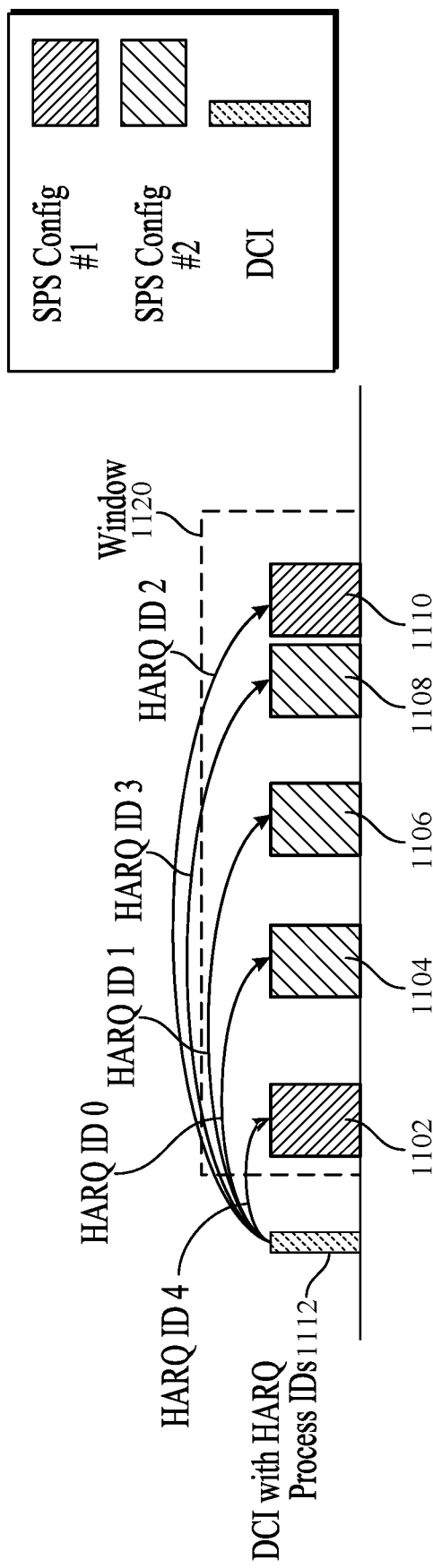

In some aspects, the gNB can use a group DCI to indicate (new) HARQ process IDs for multiple SPS occasions. FIG. 11 illustrates an example of using a group DCI to indicate HARQ process IDs for one or more SPS occasions, in accordance with certain aspects of the present disclosure. As shown, the gNB can use a dynamic DCI 1112 (e.g., group DCI) to carry HARQ process IDs 0, 1, 2, 3, and 4 for multiple SPS occasions within a transmission window 1120. In particular, the DCI 1112 indicates HARQ process ID 4 for SPS occasion 1102, HARQ process ID 0 for SPS occasion 1104, HARQ process ID 1 for SPS occasion 1106, HARQ process ID 3 for SPS occasion 1108, and HARQ process ID 2 for SPS occasion 1110.

In some aspects, the gNB may allow the UE to transmit an acknowledgment for the DCI 1112 (e.g., for improved reliability of the group DCI). Additionally or alternatively, the gNB may specify, within DCI 1112, a UE behavior that applies within the transmission window 1120. The UE behavior, for example, may indicate at least one of: whether the UE is to combine data from conflicted SPS occasions when there is a conflict, whether the UE is prioritize a previous SPS configuration with existing HARQ process ID when there is a conflict, whether the UE is to prioritize a new SPS configuration with a new HARQ process ID when there is a conflict, etc. In some aspects, the DCI 1112 can be piggybacked on a SPS occasion that occurs prior to the transmission window 1120.

Figure 12:
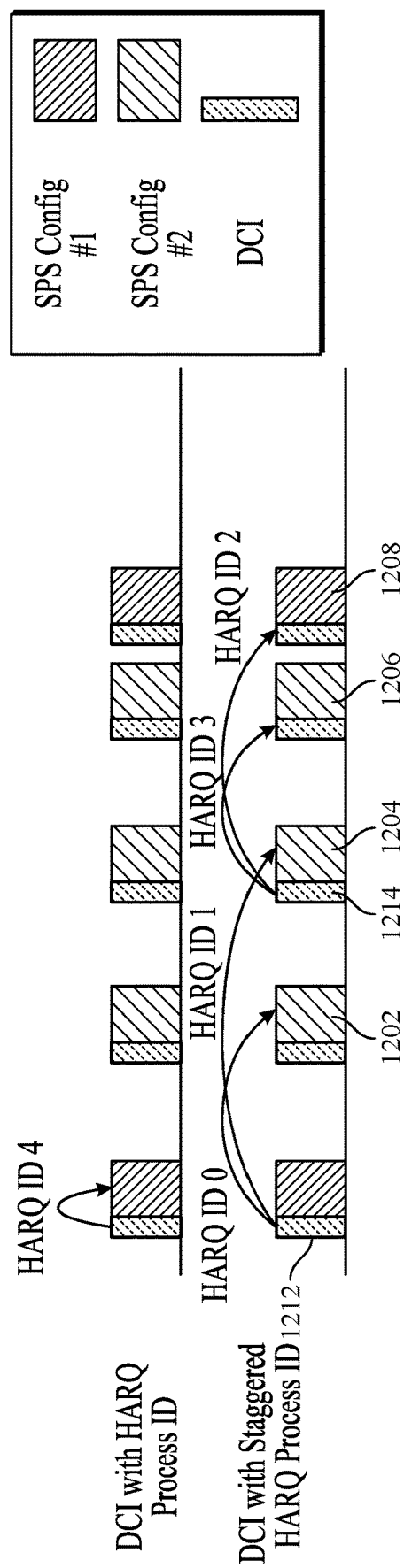

FIG. 12 illustrates an example of multiplexing HARQ process ID/HARQ process ID offset with data on the SPS occasions, in accordance with certain aspects of the present disclosure. In some cases, when the HARQ process information (e.g., HARQ process ID, HARQ process ID offset, etc.) is multiplexed with data on an SPS occasion, the UE may have to receive the HARQ process information a certain amount of time prior to the PDSCH (with the data). In these situations, the HARQ process ID may be sent a predetermined amount of time (e.g., n SPS occasions) before the respective PDSCH.

Here, the gNB may send a DCI 1212 with staggered HARQ process IDs 0 and 1 and a DCI 1214 with staggered HARQ process IDs 3 and 2. The DCI 1212 indicates that the staggered HARQ process ID 0 is for the SPS occasion 1202 and that the staggered HARQ process ID 1 is for SPS occasion 1204. The DCI 1214 indicates that the staggered HARQ process ID 3 is for SPS occasion 1206 and that the staggered HARQ process ID 2 is for SPS occasion 1208. The DCI(s) can indicate multiple HARQ process IDs for multiple SPS occasions and/or multiple SPS configurations.

The gnB may determine when to send the DCI(s) 1212, 1214 based on the HARQ control and data processing delay and periodicity of the SPS configuration(s). In one aspect, the delay may be associated with the k0 value. In some aspects, the gNB may indicate that HARQ process information is multiplexed with data via a configured scheduling radio network temporary identifier (CS-RNTI) or new radio network temporary identifier (RNTI). For example, the PDSCH may be scrambled with CS-RNTI or the new RNTI.

Figure 13:
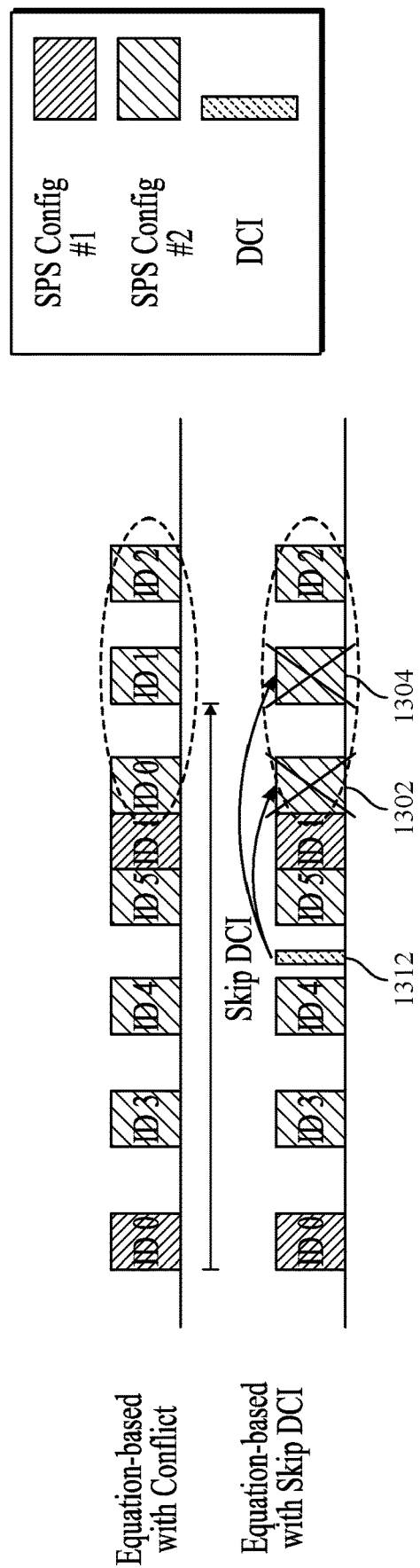
FIG. 13 illustrates another example of using DCI to avoid a HARQ process ID conflict between multiple SPS configurations, in accordance with certain aspects of the present disclosure.

In some aspects, the gNB may use DCI to indicate that the UE is to refrain from monitoring for a PDSCH transmission during a SPS occasion that has a HARQ process ID conflict. FIG. 13 illustrates a reference example of using DCI to trigger the UE to refrain from monitoring during a SPS occasion that has a HARQ process ID conflict, in accordance with certain aspects of the present disclosure.

Here, if the gNB does not want the UE to use a particular HARQ ID due to pending retransmission (or lack of feedback or unexpired HARQ timer, etc.), the gNB can send a DCI 1312 with a "skip" indication for that particular HARQ ID. When the UE receives the DCI 1312, it skips the HARQ process ID and moves to the next HARQ process ID (e.g., based on Equation 1).

As shown, the DCI 1312 may indicate to the UE to skip HARQ process IDs for SPS occasions 1302 and 1304. In one aspect, the DCI payload may be one or more bits (e.g., a bit mask for each HARQ process ID with conflict). In one aspect, the DCI payload can include the HARQ process ID(s). In some aspects, the DCI 1312 can also be piggybacked on one of the SPS occasions. In some aspects, the DCI 1312 can also be acknowledged for improved reliability.

Figure 14:
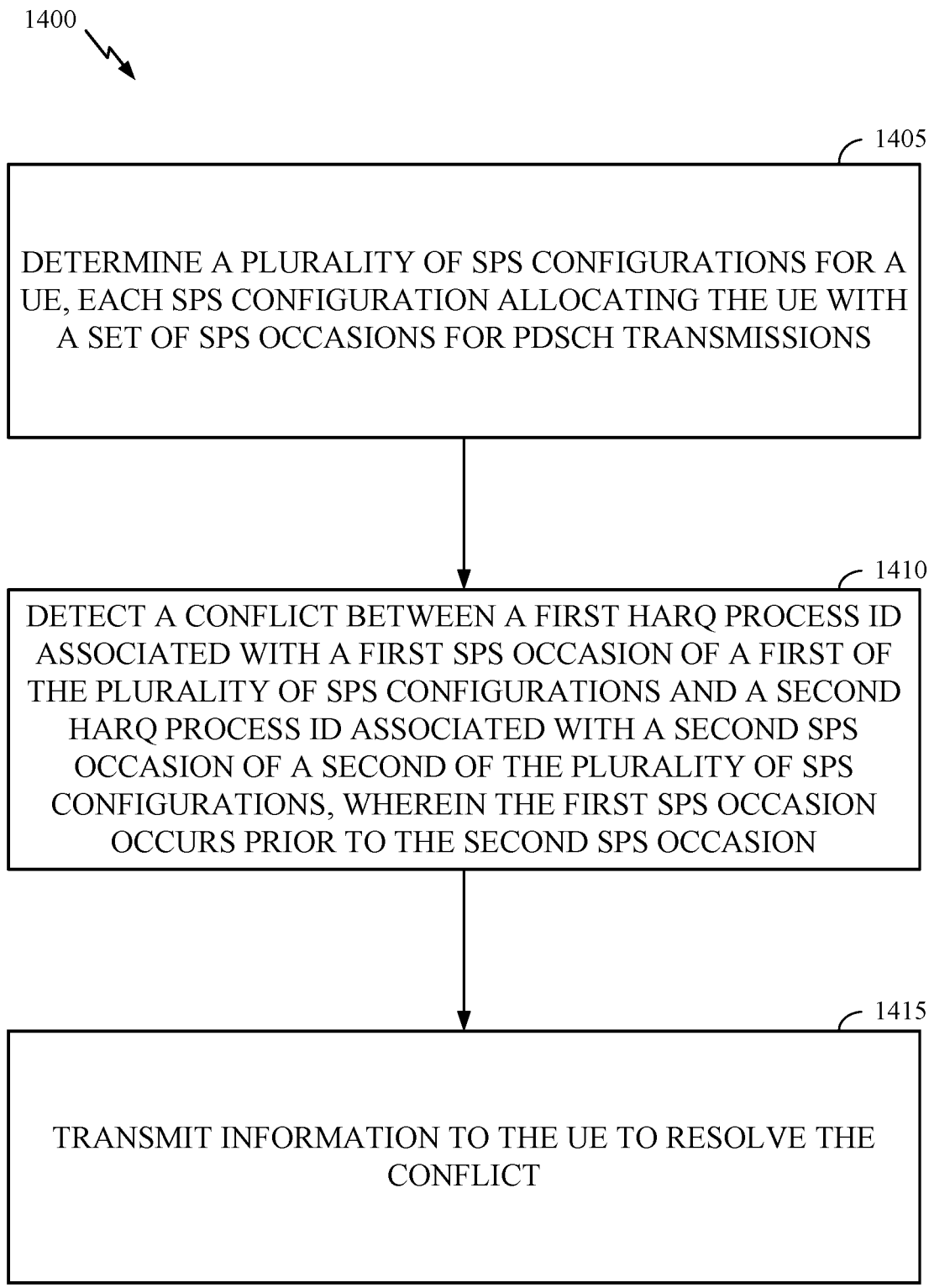
FIG. 14 is a flow diagram illustrating example operations for wireless communication by a network entity, in accordance with certain aspects of the present disclosure.

FIG. 14 is a flow diagram illustrating example operations 1400 for wireless communication, in accordance with certain aspects of the present disclosure. The operations 1400 may be performed, for example, by a network entity (e.g., gNB such as the BS 110a in the wireless communication network 100). The operations 1400 may be complimentary operations by the network entity to the operations 1500 performed by the UE. Operations 1400 may be implemented as software components that are executed and run on one or more processors (e.g., controller/processor 240 of FIG. 2). Further, the transmission and reception of signals by the network entity in operations 1400 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

The operations 1400 may begin at 1405, where the network entity determines a plurality of SPS configurations (e.g., SPS configuration #1, SPS configuration #2) for a UE. Each SPS configuration allocates the UE with a set of SPS occasions for PDSCH transmissions.

At 1410, the network entity detects a conflict between a first HARQ process ID associated with a first SPS occasion of a first of the plurality of SPS configurations (e.g., HARQ process ID 0 of SPS occasion 902) and a second HARQ process ID associated with a second SPS occasion of a second of the plurality of SPS configurations (e.g., HARQ process ID 0 of SPS occasion 910). The first SPS occasion occurs prior to the second SPS occasion. In some aspects, the conflict (at 1410) may be detected after an occurrence of the first SPS occasion and prior to an occurrence of the second SPS occasion. In some aspects, detecting the conflict (at 1410) may include at least one of (i) determining that the HARQ process ID associated with the first SPS occasion and the HARQ process ID associated with the second SPS occasion are the same and (ii) determining that the HARQ process ID associated with the first SPS occasion has not been released within a threshold amount of time of an occurrence of the second SPS occasion.

At 1415, the network entity transmits information to the UE to resolve the conflict. In some aspects, the information (at 1415) may be transmitted via MAC-CE signaling. In some aspects, the information (at 1415) may be transmitted via DCI. In some aspects, the information (e.g., via MAC-CE, via DCI, etc.) may be transmitted prior to an occurrence of the second SPS occasion.

In some aspects, the information (at 1415) may be transmitted during a SPS occasion of one of the plurality of SPS configurations that occurs prior to the occurrence of the second SPS occasion. In one aspect, the information (at 1415) may be multiplexed with a data payload of a PDSCH transmission during a SPS occasion of one of the plurality of SPS configurations that occurs prior to the occurrence of the second SPS occasion. In some aspects, the information (at 1415) may be transmitted (e.g., via DCI) on resources used for transmission of a control channel prior to the occurrence of the second SPS occasion.

In some aspects, the information (at 1415) may include a HARQ process ID offset for the second SPS occasion. In these aspects, the operations 1400 may further include the network entity determining a third HARQ process ID for the second SPS occasion, based on the HARQ process ID offset.

In some aspects, the information (at 1415) may include a third HARQ process ID for the second SPS occasion. In one aspect, the third HARQ process ID may be determined from a subset of the plurality of HARQ process IDs that are not being used by the plurality of SPS configurations, where the plurality of SPS configurations share a plurality of HARQ process IDs. In another aspect, the third HARQ process ID may be determined from a set of HARQ process IDs reserved for resolving the conflict.

In some aspects, the information (at 1415) may include a third HARQ process ID for the second SPS occasion and a fourth HARQ process ID for a third SPS occasion of one of the plurality of SPS configurations, where the third SPS occasion occurs after the second SPS occasion. In these aspects, the information (at 1415) may be transmitted via a group DCI. The group DCI may be transmitted prior to an occurrence of a transmission window that includes at least the second SPS occasion and the third SPS occasion. In some cases, the group DCI may be transmitted during a SPS occasion that occurs prior to the transmission window. In some cases, the group DCI may include an indication of a UE behavior that applies during the transmission window. For example, the UE behavior can indicate at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

In some aspects, the information (at 1415) (e.g., via DCI) may be transmitted a predetermined amount of time prior to an occurrence of at least the second SPS occasion. The predetermined amount of time may be based on a periodicity of the SPS configuration associated with the second SPS occasion and a HARQ control and data processing delay.

In some aspects, the information (at 1415) may include an indication to refrain from monitoring for the PDSCH transmission during the second SPS occasion. In these aspects, the indication may include (i) one or more bits that indicate the second HARQ process ID or (ii) the second HARQ process ID.

In some aspects, the information (at 1415) may be transmitted via a DCI that includes only the information for resolving the conflict. In these aspects, the information may include an indication of at least one of a HARQ process ID offset for the second SPS occasion, a third HARQ process ID for the second SPS occasion, the second SPS configuration, or the second SPS occasion.

Figure 15:
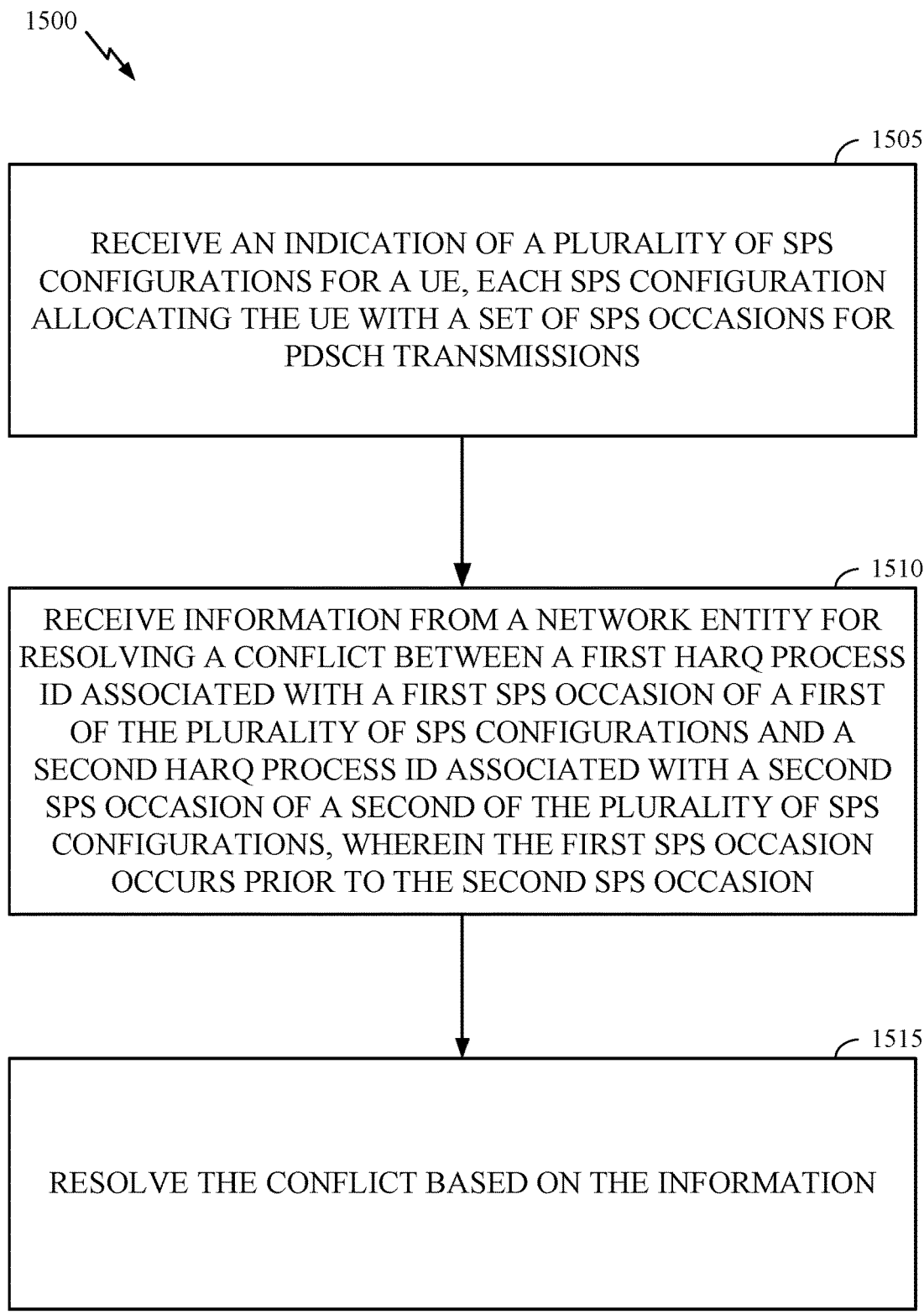
FIG. 15 is a flow diagram illustrating example operations for wireless communication by a UE, in accordance with certain aspects of the present disclosure.

FIG. 15 is a flow diagram illustrating example operations 1500 for wireless communication, in accordance with certain aspects of the present disclosure. The operations 1500 may be performed, for example, by UE (e.g., such as a UE 120*a* in the wireless communication network 100). The operations 1500 may be complimentary operations by the UE to the operations 1400 performed by the BS. Operations 1500 may be implemented as software components that are executed and run on one or more processors (e.g., controller/processor 280 of FIG. 2). Further, the transmission and reception of signals by the UE in operations 1500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1500 may begin at 1505, where the UE receives an indication of a plurality of SPS configurations. Each SPS configuration allocates the UE with a set of SPS occasions for PDSCH transmissions.

At 1510, the UE receives information from a network entity for resolving a conflict between a first HARQ process ID associated with a first SPS occasion of a first of the plurality of SPS configurations and a second HARQ process ID associated with a second SPS occasion of a second of the plurality of SPS configurations. The first SPS occasion occurs prior to the second SPS occasion. In some aspects, the information (at 1510) may be received via MAC-CE signaling. In some aspects, the information (at 1510) may be received via DCI. In some aspects, the information (e.g., via MAC-CE, via DCI, etc.) may be received prior to an occurrence of the second SPS occasion. At 1515, the UE resolves the conflict based on the information.

In some aspects, the information (at 1510) may be received during a SPS occasion of one of the plurality of SPS configurations that occurs prior to the occurrence of the second SPS occasion. In one aspect, the information (at 1510) may be multiplexed with a data payload of a PDSCH transmission during a SPS occasion of one of the plurality of SPS configurations that occurs prior to the occurrence of the second SPS occasion. In some aspects, the information (at 1510) may be received (e.g., via DCI) on resources used for transmission of a control channel prior to the occurrence of the second SPS occasion.

In some aspects, the information (at 1510) may include a HARQ process ID offset for the second SPS occasion. In these aspects, resolving the conflict (at 1515) may include determining a third HARQ process ID for the second SPS occasion, based on the HARQ process ID offset. In some aspects, the information (at 1510) may include the third HARQ process ID for the second SPS occasion.

In some aspects, the information (at 1510) may include a third HARQ process ID for the second SPS occasion and a fourth HARQ process ID for a third SPS occasion of one of the plurality of SPS configurations, where the third SPS occasion occurs after the second SPS occasion. In these aspects, the information (at 1510) may be received via a group DCI. The group DCI may be received prior to an occurrence of a transmission window that includes at least the second SPS occasion and the third SPS occasion. In some cases, the group DCI may be received during a SPS occasion that occurs prior to the transmission window. In some cases, the group DCI may include an indication of a UE behavior that applies during the transmission window. For example, the UE behavior can indicate at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

In some aspects, the information (at 1510) (e.g., via DCI) may be received a predetermined amount of time prior to an occurrence of at least the second SPS occasion. The predetermined amount of time may be based on a periodicity of the SPS configuration associated with the second SPS occasion and a HARQ control and data processing delay.

In some aspects, the information (at 1510) may include an indication that the UE is to refrain from monitoring for the PDSCH transmission during the second SPS occasion. In these aspects, the indication may include (i) one or more bits that indicate the second HARQ process ID or (ii) the second HARQ process ID.

In some aspects, the information (at 1510) may be received via a DCI that includes only the information for resolving the conflict. In these aspects, the information may include an indication of at least one of a HARQ process ID offset for the second SPS occasion, a third HARQ process ID for the second SPS occasion, the second SPS configuration, or the second SPS occasion.

Figure 16:
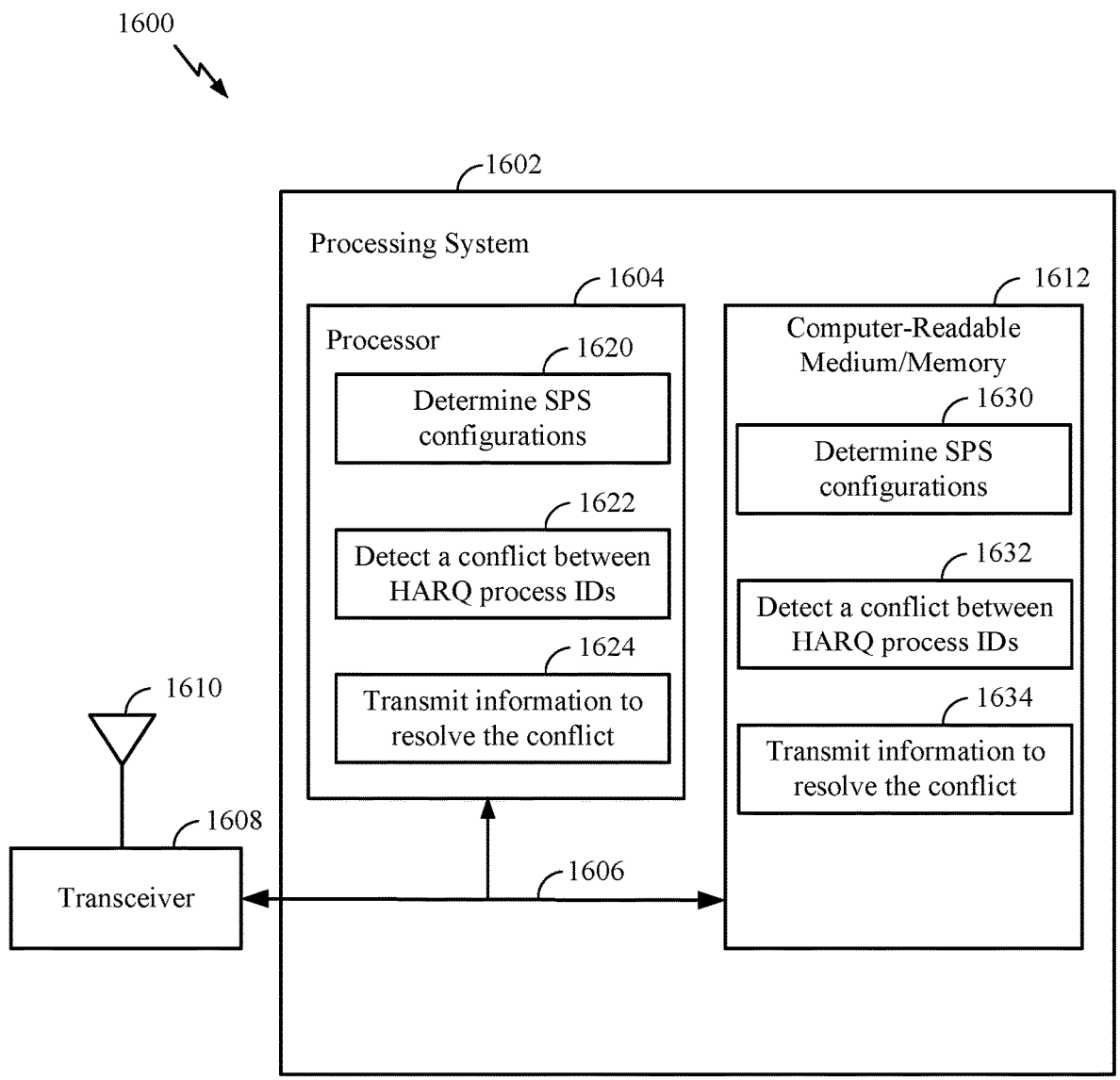
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 14. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 14, or other operations for performing the various techniques discussed herein. In certain aspects, computer-readable medium/memory 1612 stores code for performing one or more of the operations illustrated in FIG. 14. For example, computer-readable medium/memory 1612 includes: code 1630 for determining a plurality of SPS configurations for a UE, each SPS configuration allocating the UE with a set of SPS occasions for PDSCH transmissions; code 1632 for detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and code 1634 for transmitting information to the UE to resolve the conflict.

Figure 17:
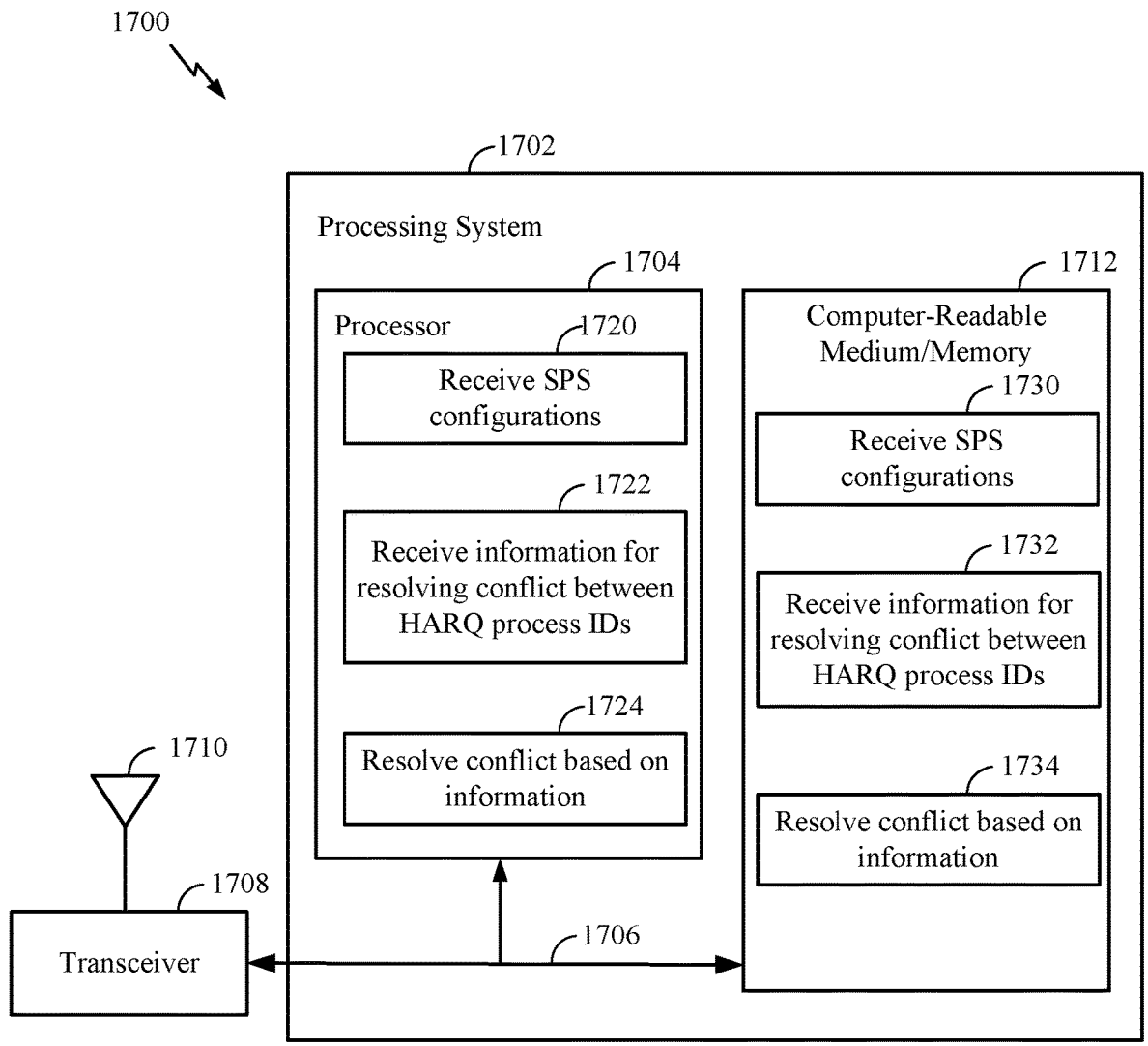
FIG. 17 illustrates a communications device that may include various components configured to perform operations for the techniques disclosed herein in accordance with aspects of the present disclosure.

In certain aspects, the processor 1604 has circuitry configured to implement the code stored in the computer-readable medium/memory 1612. The processor 1604 includes circuitry for performing one or more of the operations illustrated in FIG. 14. For example, processor 1604 includes: circuitry 1620 for determining a plurality of SPS configurations for a UE, each SPS configuration allocating the UE with a set of SPS occasions for PDSCH transmissions; circuitry 1622 for detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and circuitry 1624 for transmitting information to the UE to resolve the conflict FIG. 17 illustrates a communications device 1700 that may include various components (e.g., corresponding to means-plus-function components) configured to perform operations for the techniques disclosed herein, such as the operations illustrated in FIG. 15. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 15, or other operations for performing the various techniques discussed herein. In certain aspects, computer-readable medium/memory 1712 stores code for performing one or more of the operations illustrated in FIG. 15. For example, computer-readable medium/memory 1712 includes: code 1730 for receiving an indication of a plurality of SPS configurations, each SPS configuration allocating the UE with a set of SPS occasions for PDSCH transmissions; code 1732 for receiving information from a network entity for resolving a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and code 1734 for resolving the conflict based on the information.

In certain aspects, the processor 1704 has circuitry configured to implement the code stored in the computer-readable medium/memory 1712. The processor 1704 includes circuitry for performing one or more of the operations illustrated in FIG. 15. For example, the processor 1704 includes: circuitry 1720 for receiving an indication of a plurality of SPS configurations, each SPS configuration allocating the UE with a set of SPS occasions for PDSCH transmissions; circuitry 1722 for receiving information from a network entity for resolving a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and circuitry 1724 for resolving the conflict based on the information.

EXAMPLE CLAUSES

Implementation examples are described in the following numbered clauses:

Clause 1: A method for wireless communication by a UE, comprising: receiving an indication of a plurality of SPS configurations, each SPS configuration allocating the UE with a set of SPS occasions for PDSCH transmissions; receiving information from a network entity for resolving a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and resolving the conflict based on the information.

Clause 2: The method of clause 1, wherein the information is received via medium access control control element (MAC-CE) signaling.

Clause 3: The method of clause 1, wherein the information is received via downlink control information (DCI).

Clause 4: The method of clause 3, wherein the DCI is received prior to an occurrence of the second SPS occasion.

Clause 5: The method according to any of clauses 3-4, wherein the DCI is received during a SPS occasion of one of the plurality of SPS configurations that occurs prior to the occurrence of the second SPS occasion.

Clause 6: The method of clause 5, wherein the information is multiplexed with a data payload of the PDSCH transmission during the SPS occasion.

Clause 7: The method according to any of clauses 3-4, wherein the DCI is received on resources used for transmission of a control channel prior to the occurrence of the second SPS occasion.

Clause 8: The method according to any of clauses 1-7, wherein the information comprises a HARQ process ID offset for the second SPS occasion.

Clause 9: The method of clause 8, wherein resolving the conflict comprises determining a third HARQ process ID for the second SPS occasion, based on the HARQ process ID offset.

Clause 10: The method according to any of clauses 1-9, wherein the information comprises a third HARQ process ID for the second SPS occasion.

Clause 11: The method according to any of clauses 1-10, wherein the information comprises a third HARQ process ID for the second SPS occasion and a fourth HARQ process ID for a third SPS occasion of one of the plurality of SPS configurations, wherein the third SPS occasion occurs after the second SPS occasion.

Clause 12: The method according to any of clauses 3-11, wherein the DCI is a group DCI.

Clause 13: The method of clause 12, wherein the group DCI is received prior to an occurrence of a transmission window comprising the second SPS occasion and the third SPS occasion.

Clause 14: The method of clause 13, wherein the group DCI is received during a SPS occasion that occurs prior to the transmission window.

Clause 15: The method according to any of clauses 12-14, wherein the group DCI further comprises an indication of a UE behavior that applies during the transmission window.

Clause 16: The method of clause 15, wherein the UE behavior indicates at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

Clause 17: The method according to any of clauses 3-16, wherein the DCI is received a predetermined amount of time prior to an occurrence of at least the second SPS occasion.

Clause 18: The method of clause 17, wherein the predetermined amount of time is based on a periodicity of the SPS configuration associated with the second SPS occasion and a HARQ control and data processing delay.

Clause 19: The method according to any of clauses 1-18, wherein the information comprises an indication to refrain from monitoring for the PDSCH transmission during the second SPS occasion.

Clause 20: The method of clause 19, wherein the indication comprises one or more bits that indicate the second HARQ process ID.

Clause 21: The method of clause 19, wherein the indication comprises the second HARQ process ID.

Clause 22: The method of clause 3, wherein the DCI includes only the information for resolving the conflict.

Clause 23: The method of clause 22, wherein the information comprises an indication of at least one of a HARQ process ID offset for the second SPS occasion, a third HARQ process ID for the second SPS occasion, the second SPS configuration, or the second SPS occasion.

Clause 24: A method for wireless communication by a network entity, comprising: determining a plurality of SPS configurations for a UE, each SPS configuration allocating the UE with a set of SPS occasions for PDSCH transmissions; detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and transmitting information to the UE to resolve the conflict.

Clause 25: The method of clause 24, wherein the information is transmitted via medium access control control element (MAC-CE) signaling.

Clause 26: The method of clause 24, wherein the information is transmitted via downlink control information (DCI).

Clause 27: The method of clause 26, wherein the DCI is transmitted prior to an occurrence of the second SPS occasion.

Clause 28: The method according to any of clauses 26-27, wherein the DCI is transmitted during a SPS occasion of one of the plurality of SPS configurations that occurs prior to the occurrence of the second SPS occasion.

Clause 29: The method of clause 28, wherein the information is multiplexed with a data payload of the PDSCH transmission during the SPS occasion.

Clause 30: The method according to any of clauses 26-27, wherein the DCI is transmitted on resources used for transmission of a control channel prior to the occurrence of the second SPS occasion.

Clause 31: The method according to any of clauses 24-30, wherein the information comprises a HARQ process ID offset for the second SPS occasion.

Clause 32: The method of clause 31, further comprising determining a third HARQ process ID for the second SPS occasion, based on the HARQ process ID offset.

Clause 33: The method according to any of clauses 24-32, wherein the information comprises a third HARQ process ID for the second SPS occasion.

Clause 34: The method according to any of clauses 24-33, wherein: the plurality of SPS configurations share a plurality of HARQ process IDs; and the third HARQ process ID is determined from a subset of the plurality of HARQ process IDs that are not being used by the plurality of SPS configurations.

Clause 35: The method of clause 33, wherein the third HARQ process ID is determined from a set of HARQ process IDs reserved for resolving at least the conflict.

Clause 36: The method according to any of clauses 24-35, wherein the information comprises a third HARQ process ID for the second SPS occasion and a fourth HARQ process ID for a third SPS occasion of one of the plurality of SPS configurations, wherein the third SPS occasion occurs after the second SPS occasion.

Clause 37: The method according to any of clauses 26-36, wherein the DCI is a group DCI.

Clause 38: The method of clause 37, wherein the group DCI is transmitted prior to an occurrence of a transmission window comprising the second SPS occasion and the third SPS occasion.

Clause 39: The method of clause 38, wherein the group DCI is transmitted during a SPS occasion that occurs prior to the transmission window.

Clause 40: The method according to any of clauses 37-39, wherein the group DCI further comprises an indication of a UE behavior that applies during the transmission window.

Clause 41: The method of clause 40, wherein the UE behavior indicates at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

Clause 42: The method according to any of clauses 26-41, wherein the DCI is transmitted a predetermined amount of time prior to an occurrence of at least the second SPS occasion.

Clause 43: The method of clause 42, wherein the predetermined amount of time is based on a periodicity of the SPS configuration associated with the second SPS occasion and a HARQ control and data processing delay.

Clause 44: The method according to any of clauses 24-43, wherein the information comprises an indication to refrain from monitoring for the PDSCH transmission during the second SPS occasion.

Clause 45: The method of clause 44, wherein the indication comprises one or more bits that indicate the second HARQ process ID.

Clause 46: The method of clause 44, wherein the indication comprises the second HARQ process ID.

Clause 47: The method of clause 26, wherein the DCI includes only the information for resolving the conflict.

Clause 48: The method of clause 47, wherein the information comprises an indication of at least one of a HARQ process ID offset for the second SPS occasion, a third HARQ process ID for the second SPS occasion, the second SPS configuration, or the second SPS occasion.

Clause 49: The method of clause 24, wherein the conflict is detected after an occurrence of the first SPS occasion and prior to an occurrence of the second SPS occasion.

Clause 50: The method according to any of clauses 24-49, wherein detecting the conflict comprises determining that the HARQ process ID associated with the first SPS occasion and the HARQ process ID associated with the second SPS occasion are the same.

Clause 51: The method of clause 50, wherein detecting the conflict further comprises determining that the HARQ process ID associated with the first SPS occasion has not been released within a threshold amount of time of an occurrence of the second SPS occasion.

Clause 52: A method for wireless communication by a UE, comprising: receiving an indication of a plurality of SPS configurations, each SPS configuration allocating the UE with a set of SPS occasions for PDSCH transmissions; receiving information from a network entity for resolving a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and resolving the conflict based on the information.

Clause 53: The method of clause 52, wherein the information is received via medium access control control element (MAC-CE) signaling.

Clause 54: The method of clause 52, wherein the information is received via downlink control information (DCI) prior to an occurrence of the second SPS occasion.

Clause 55: The method of clause 54, wherein: the DCI is received during a SPS occasion of one of the plurality of SPS configurations that occurs prior to the occurrence of the second SPS occasion.

Clause 56: The method of clause 55, wherein the information is multiplexed with a data payload of the PDSCH transmission during the SPS occasion.

Clause 57: The method of clause 54, wherein the DCI is received on resources used for transmission of a control channel prior to the occurrence of the second SPS occasion.

Clause 58: The method of clause 54, wherein: the information comprises a HARQ process ID offset for the second SPS occasion; and resolving the conflict comprises determining a third HARQ process ID for the second SPS occasion, based on the HARQ process ID offset.

Clause 59: The method of clause 54, wherein the information comprises a third HARQ process ID for the second SPS occasion.

Clause 60: The method of clause 54, wherein the information comprises a third HARQ process ID for the second SPS occasion and a fourth HARQ process ID for a third SPS occasion of one of the plurality of SPS configurations, wherein the third SPS occasion occurs after the second SPS occasion.

Clause 61: The method of clause 60, wherein: the DCI is a group DCI that is received prior to an occurrence of a transmission window comprising the second SPS occasion and the third SPS occasion; the group DCI is received during a SPS occasion that occurs prior to the transmission window; the group DCI further comprises an indication of a UE behavior that applies during the transmission window; and the UE behavior indicates at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

Clause 62: The method of clause 54, wherein: the DCI is received a predetermined amount of time prior to an occurrence of at least the second SPS occasion; and the predetermined amount of time is based on a periodicity of the SPS configuration associated with the second SPS occasion and a HARQ control and data processing delay.

Clause 63: The method of clause 54, wherein: the information comprises an indication to refrain from monitoring for the PDSCH transmission during the second SPS occasion; and the indication comprises (i) one or more bits that indicate the second HARQ process ID or (ii) the second HARQ process ID.

Clause 64: The method of clause 54, wherein the DCI includes only the information for resolving the conflict.

Clause 65: The method of clause 64, wherein the information comprises an indication of at least one of a HARQ process ID offset for the second SPS occasion, a third HARQ process ID for the second SPS occasion, the second SPS configuration, or the second SPS occasion.

Clause 66: A method for wireless communication by a network entity, comprising: determining a plurality of SPS configurations for a UE, each SPS configuration allocating the UE with a set of SPS occasions for PDSCH transmissions; detecting a conflict between a first HARQ process ID associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and transmitting information to the UE to resolve the conflict.

Clause 67: The method of clause 66, wherein the information is transmitted via medium access control control element (MAC-CE) signaling.

Clause 68: The method of clause 66, wherein the information is transmitted via downlink control information (DCI) transmitted prior to an occurrence of the second SPS occasion.

Clause 69: The method of clause 68, wherein: the DCI is transmitted during a SPS occasion of one of the plurality of SPS configurations that occurs prior to the occurrence of the second SPS occasion; and the information is multiplexed with a data payload of the PDSCH transmission during the SPS occasion.

Clause 70: The method of clause 68, wherein the DCI is transmitted on resources used for transmission of a control channel prior to the occurrence of the second SPS occasion.

Clause 71: The method of clause 68, wherein the information comprises a HARQ process ID offset for the second SPS occasion, the method further comprising determining a third HARQ process ID for the second SPS occasion, based on the HARQ process ID offset.

Clause 72: The method of clause 68, wherein: the plurality of SPS configurations share a plurality of HARQ process IDs; the information comprises a third HARQ process ID for the second SPS occasion; and the third HARQ process ID is determined from (i) a subset of the plurality of HARQ process IDs that are not being used by the plurality of SPS configurations or (ii) a set of HARQ process IDs reserved for resolving at least the conflict.

Clause 73: The method of clause 68, wherein the information comprises a third HARQ process ID for the second SPS occasion and a fourth HARQ process ID for a third SPS occasion of one of the plurality of SPS configurations, wherein the third SPS occasion occurs after the second SPS occasion.

Clause 74: The method of clause 73, wherein: the DCI is a group DCI that is transmitted prior to an occurrence of a transmission window comprising the second SPS occasion and the third SPS occasion; the group DCI is transmitted during a SPS occasion that occurs prior to the transmission window; the group DCI further comprises an indication of a UE behavior that applies during the transmission window; and the UE behavior indicate at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

Clause 75: The method of clause 68, wherein: the DCI is transmitted a predetermined amount of time prior to an occurrence of at least the second SPS occasion; and the predetermined amount of time is based on a periodicity of the SPS configuration associated with the second SPS occasion and a HARQ control and data processing delay.

Clause 76: The method of clause 68, wherein: the information comprises an indication to refrain from monitoring for the PDSCH transmission during the second SPS occasion; and the information comprises (i) one or more bits that indicate the second HARQ process ID or (ii) the second HARQ process ID.

Clause 77: The method of clause 68, wherein: the DCI includes only the information for resolving the conflict; and the information comprises an indication of at least one of a HARQ process ID offset for the second SPS occasion, a third HARQ process ID for the second SPS occasion, the second SPS configuration, or the second SPS occasion.

Clause 78: The method of clause 66, wherein the conflict is detected after an occurrence of the first SPS occasion and prior to an occurrence of the second SPS occasion.

Clause 79: The method of clause 66, wherein detecting the conflict comprises: determining that the HARQ process ID associated with the first SPS occasion and the HARQ process ID associated with the second SPS occasion are the same; and determining that the HARQ process ID associated with the first SPS occasion has not been released within a threshold amount of time of an occurrence of the second SPS occasion.

Clause 80: An apparatus comprising a processing system, a receiver, and a transmitter, the apparatus being configured to perform the method according to any of clauses 1-23 and 52-65.

Clause 81: An apparatus comprising a processing system, a receiver, and a transmitter, the apparatus being configured to perform the method according to any of clauses 24-52 and 66-79.

Clause 82: An apparatus comprising means for performing the method according to any of clauses 1-23 and 52-65.

Clause 83: An apparatus comprising means for performing the method according to any of clauses 24-52 and 66-79.

Clause 84: A non-transitory computer-readable medium comprising computer-executable instructions that, when executed by one or more processors of a processing system, cause a UE to perform the method according to any of clauses 1-23 and 52-65.

Clause 85: A non-transitory computer-readable medium comprising computer-executable instructions that, when executed by one or more processors of a processing system, cause a network entity to perform the method according to any of clauses 24-52 and 66-79.

Clause 86: A computer program product for wireless communication by a network entity embodied on a computer-readable storage medium, the computer-readable storage medium comprising code for performing the method according to any of clauses 1-23 and 53-65.

Clause 87: A computer program product for wireless communication by a UE embodied on a computer-readable storage medium, the computer-readable storage medium comprising code for performing the method according to any of clauses 24-52 and 66-79.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 14-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving an indication of a plurality of semi persistently scheduled (SPS) configurations, each SPS configuration allocating the UE with a set of SPS occasions for physical downlink shared channel (PDSCH) transmissions;
receiving information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and
resolving the conflict based on the information.

2. The method of claim 1, wherein the information is received via medium access control control element (MAC-CE) signaling.

3. The method of claim 1, wherein the information is received via downlink control information (DCI) prior to an occurrence of the second SPS occasion.

4. The method of claim 3, wherein:
the DCI is received during a SPS occasion of one of the plurality of SPS configurations that occurs prior to the occurrence of the second SPS occasion.

5. The method of claim 4, wherein the information is multiplexed with a data payload of the PDSCH transmission during the SPS occasion.

6. The method of claim 3, wherein the DCI is received on resources used for transmission of a control channel prior to the occurrence of the second SPS occasion.

7. The method of claim 3, wherein:
the information comprises a HARQ process ID offset for the second SPS occasion; and
resolving the conflict comprises determining a third HARQ process ID for the second SPS occasion, based on the HARQ process ID offset.

8. The method of claim 3, wherein the information comprises a third HARQ process ID for the second SPS occasion.

9. The method of claim 3, wherein the information comprises a third HARQ process ID for the second SPS occasion and a fourth HARQ process ID for a third SPS occasion of one of the plurality of SPS configurations, wherein the third SPS occasion occurs after the second SPS occasion.

10. The method of claim 9, wherein:
the DCI is a group DCI that is received prior to an occurrence of a transmission window comprising the second SPS occasion and the third SPS occasion;
the group DCI is received during a SPS occasion that occurs prior to the transmission window;
the group DCI further comprises an indication of a UE behavior that applies during the transmission window; and
the UE behavior indicates at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

11. The method of claim 3, wherein:
the DCI is received a predetermined amount of time prior to an occurrence of at least the second SPS occasion; and
the predetermined amount of time is based on a periodicity of the SPS configuration associated with the second SPS occasion and a HARQ control and data processing delay.

12. The method of claim 3, wherein:
the information comprises an indication to refrain from monitoring for the PDSCH transmission during the second SPS occasion; and
the indication comprises (i) one or more bits that indicate the second HARQ process ID or (ii) the second HARQ process ID.

13. The method of claim 3, wherein the DCI includes only the information for resolving the conflict.

14. The method of claim 13, wherein the information comprises an indication of at least one of a HARQ process ID offset for the second SPS occasion, a third HARQ process ID for the second SPS occasion, the second SPS configuration, or the second SPS occasion.

15. An apparatus for wireless communication, comprising:
a receiver configured to:
receive an indication of a plurality of semi persistently scheduled (SPS) configurations, each SPS configuration allocating the apparatus with a set of SPS occasions for physical downlink shared channel (PDSCH) transmissions; and
receive information from a network entity for resolving a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and
a processing system comprising:
a memory comprising computer-executable instructions; and
one or more processors configured to execute the computer-executable instructions and cause the processing system to resolve the conflict based on the information.

16. A method for wireless communication by a network entity, comprising:
determining a plurality of semi persistently scheduled (SPS) configurations for a user equipment (UE), each SPS configuration allocating the UE with a set of SPS occasions for physical downlink shared channel (PDSCH) transmissions;
detecting a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and transmitting information to the UE to resolve the conflict.

17. The method of claim 16, wherein the information is transmitted via medium access control control element (MAC-CE) signaling.

18. The method of claim 16, wherein the information is transmitted via downlink control information (DCI) transmitted prior to an occurrence of the second SPS occasion.

19. The method of claim 18, wherein:
the DCI is transmitted during a SPS occasion of one of the plurality of SPS configurations that occurs prior to the occurrence of the second SPS occasion; and
the information is multiplexed with a data payload of the PDSCH transmission during the SPS occasion.

20. The method of claim 18, wherein the DCI is transmitted on resources used for transmission of a control channel prior to the occurrence of the second SPS occasion.

21. The method of claim 18, wherein the information comprises a HARQ process ID offset for the second SPS occasion, the method further comprising determining a third HARQ process ID for the second SPS occasion, based on the HARQ process ID offset.

22. The method of claim 18, wherein:
the plurality of SPS configurations share a plurality of HARQ process IDs;
the information comprises a third HARQ process ID for the second SPS occasion; and
the third HARQ process ID is determined from (i) a subset of the plurality of HARQ process IDs that are not being used by the plurality of SPS configurations or (ii) a set of HARQ process IDs reserved for resolving at least the conflict.

23. The method of claim 18, wherein the information comprises a third HARQ process ID for the second SPS occasion and a fourth HARQ process ID for a third SPS occasion of one of the plurality of SPS configurations, wherein the third SPS occasion occurs after the second SPS occasion.

24. The method of claim 23, wherein:
the DCI is a group DCI that is transmitted prior to an occurrence of a transmission window comprising the second SPS occasion and the third SPS occasion;
the group DCI is transmitted during a SPS occasion that occurs prior to the transmission window;
the group DCI further comprises an indication of a UE behavior that applies during the transmission window; and
the UE behavior indicate at least one of: (i) whether to combine data from PDSCH transmissions of SPS occasions; (ii) whether to prioritize the PDSCH transmission of a SPS occasion outside of the transmission window; or (iii) whether to prioritize the PDSCH transmission of a SPS occasion within the transmission window.

25. The method of claim 18, wherein:
the DCI is transmitted a predetermined amount of time prior to an occurrence of at least the second SPS occasion; and
the predetermined amount of time is based on a periodicity of the SPS configuration associated with the second SPS occasion and a HARQ control and data processing delay.

26. The method of claim 18, wherein:
the information comprises an indication to refrain from monitoring for the PDSCH transmission during the second SPS occasion; and
the information comprises (i) one or more bits that indicate the second HARQ process ID or (ii) the second HARQ process ID.

27. The method of claim 18, wherein:
the DCI includes only the information for resolving the conflict; and
the information comprises an indication of at least one of a HARQ process ID offset for the second SPS occasion, a third HARQ process ID for the second SPS occasion, the second SPS configuration, or the second SPS occasion.

28. The method of claim 16, wherein the conflict is detected after an occurrence of the first SPS occasion and prior to an occurrence of the second SPS occasion.

29. The method of claim 16, wherein detecting the conflict comprises:
determining that the HARQ process ID associated with the first SPS occasion and the HARQ process ID associated with the second SPS occasion are the same; and
determining that the HARQ process ID associated with the first SPS occasion has not been released within a threshold amount of time of an occurrence of the second SPS occasion.

30. An apparatus for wireless communication, comprising:
a processing system comprising:
a memory comprising computer-executable instructions; and
one or more processors configured to execute the computer-executable instructions and cause the processing system to:
determine a plurality of semi persistently scheduled (SPS) configurations for a user equipment (UE), each SPS configuration allocating the UE with a set of SPS occasions for physical downlink shared channel (PDSCH) transmissions; and
detect a conflict between a first hybrid automatic repeat request (HARQ) process identifier (ID) associated with a first SPS occasion of a first of the plurality of SPS configurations and a second HARQ process ID associated with a second SPS occasion of a second of the plurality of SPS configurations, wherein the first SPS occasion occurs prior to the second SPS occasion; and
a transmitter configured to transmit information to the UE to resolve the conflict.

* * * * *